United States Patent
Cochrane et al.

(10) Patent No.: US 6,460,027 B1
(45) Date of Patent: Oct. 1, 2002

(54) AUTOMATIC RECOGNITION AND REROUTING OF QUERIES FOR OPTIMAL PERFORMANCE

(75) Inventors: Roberta Jo Cochrane, Los Gatos, CA (US); George Lapis, San Jose, CA (US); Ting Yu Leung, San Jose, CA (US); Mir Hamid Pirahesh, San Jose, CA (US); Monica Sachiye Urata, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/152,559

(22) Filed: Sep. 14, 1998

(51) Int. Cl.[7] .............................................. G06F 17/30
(52) U.S. Cl. ................... 707/2; 707/3; 707/4
(58) Field of Search ........................... 707/2, 3–5, 102, 707/10, 100, 104.1

(56) References Cited

U.S. PATENT DOCUMENTS

| | | | | |
|---|---|---|---|---|
| 5,301,317 A | * | 4/1994 | Lohman et al. ................. | 707/2 |
| 5,600,831 A | * | 2/1997 | Levy et al. ..................... | 707/2 |
| 5,671,403 A | * | 9/1997 | Shekita et al. ................. | 707/3 |
| 5,768,578 A | * | 6/1998 | Kirk et al. ................... | 707/100 |
| 5,848,405 A | * | 12/1998 | Norcott ......................... | 707/1 |
| 5,940,819 A | * | 8/1999 | Beavin et al. ................. | 707/2 |
| 5,963,936 A | * | 10/1999 | Cochrane et al. .............. | 707/3 |
| 5,995,961 A | * | 11/1999 | Levy et al. ..................... | 707/4 |
| 6,023,696 A | * | 2/2000 | Osborn et al. ................. | 707/3 |
| 6,032,143 A | * | 2/2000 | Leung et al. ................... | 707/2 |
| 6,088,524 A | * | 7/2000 | Levy et al. .................. | 395/603 |
| 6,134,540 A | * | 10/2000 | Carey et al. ................... | 707/2 |
| 6,141,655 A | * | 10/2000 | Johnson et al. ................ | 707/2 |

OTHER PUBLICATIONS

Blakeley et al "Efficient Updating Materialized Views", ACM 1986, pp. 61–71.*

Segev et al "Effcient Maintenance of Rule–Derived Data through Join Pattern Indexing", ACM 1993, pp. 194–205.*

Levy et al "Rewriting Queries Using Views in Descrioption Logics", ACM 1997, pp. 99–108.*

Bello, Randall G. et al., "Materialized Views in Oracle," Proceedings of the 24th VLDB Conference, New York, USA, 1998, pp. 659–664.

Colby, Latha S. et al., "Red Brick Vista™: Aggregate Computation and Management," Proceedings of the 14th International Conference on Data Engineering, Orlando, Florida, 1998, IEEE 1998, pp. 174–177.

Pirahesh, Hamid et al., "Extensible/Rule Based Query Rewrite Optimization in Starburst," Proceedings of ACM SIGMOD '92, International Conference on Management of Data, San Diego, CA, 1992, pp. 39–48.

Srivastava, Divesh et al., "Answering Queries with Aggregation Using Views," Proceedings of the 22nd VLDB Conference, Mumbai(Bombay), India, 1996, pp. 318–329.

* cited by examiner

*Primary Examiner*—Safet Metjahic
*Assistant Examiner*—Uyen Le
(74) *Attorney, Agent, or Firm*—Gates & Cooper LLP

(57) ABSTRACT

A method, apparatus, and article of manufacture for optimizing database queries uses a derived summary table, wherein a definition of the summary table is based on a full select statement that is materialized in the table and describes how the summary table was derived. The summary table definition can be a complex query involving nested GROUP BY operations as well as complex HAVING clauses with subqueries or join operations. A query is analyzed using subsumption tests between the query and the definition of the summary table to determine whether expressions occurring anywhere in the query, but not in the summary table, can be subsumed in the summary table. In performing the query, an expression in the query is subsumed in the summary table when the expression can be re-derived from one or more of the columns of the summary table.

66 Claims, 24 Drawing Sheets

AUTOMATIC RECOGNITION AND REROUTING OF QUERIES FOR OPTIMAL PERFORMANCE

BACKGROUND OF THE INVENTION

1. Field of the Invention

This invention relates in general to database management systems performed by computers, and in particular, to the automatic recognition and rerouting of queries for optimal performance.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Organization (ANSI) and the International Standards Organization (ISO).

For most RDBMS software, combinations of tables and views are used to access data stored in tables in the database. Indices are often used to improve the performance of retrieving data from tables. However, indices are generally limited to columns from base tables. Thus, indices are not seen as suitable for:

results of aggregations, and results of joins for commonly used subsets of the data.

A view definition includes a query that, if processed, provides a temporary results table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against the created table, provided that the users are aware how the results were derived. Generally, the RDBMS software is not aware that such a table is any different from any other table in the database. Moreover, this table cannot be used by an optimizer within the RDBMS software to improve performance, even though the table may contain data that would drastically improve the performance of other queries.

This leads to the notion of summary tables or materialized views as envisioned by the present invention. These tables are similar to the created table described above, except that the definition of the table is based on a "full select" (much like a view) that is materialized in the table. The columns of the table are based on the elements of the select list of the full select.

In the present invention, with properly defined summary tables, the RDBMS software is now aware how the result in the summary table was derived. When an arbitrarily complex query is submitted, an optimizer in the RDBMS software can now consider using the summary tables to answer the query, which is a technique that requires performing subsumption tests between the query and summary table definition, and then performing compensation work once the optimizer decides that the summary table can be used for the answer.

There are extensive research activities and literature on this topic, as disclosed in the following publications, all of which are incorporated by reference herein:

1. L. S. Colby, R. L. Cole, E. Haslam, N. Jazaeri, G. Johnson, W J. McKenna, L. Schumacher, D. Wilhite. Red Brick Vista: Aggregate Computation and Management. Proceedings of the $14^{th}$ Int'l. Conference on Data Engineering, Orlando, Fla., 1998.

2. R. Bello, K. Dias, A. Downing, J. Feenan, J. Finnerty, W. Norcott, H. Sun, A. Witkowski, M. Ziauddin. Materialized Views In Oracle. Proceedings of the $24^{th}$ VLDB Conference, New York, 1998.

3. D. Srivastava, S. Dar, H. Jagadish, A. Levy. Answering Queries with Aggregation Using Views. Proceedings of the $22^{nd}$ VLDB Conference, Mumbai, India, 1996.

However, the current state of the art is that only simple SQL statements with a single query block can be optimized using summary tables, and only simple expressions can be handled.

SUMMARY OF THE INVENTION

To overcome the limitations in the prior art described above, and to overcome other limitations that will become apparent upon reading and understanding the present specification, the present invention discloses a method, apparatus, and article of manufacture for optimizing database queries using a derived summary table, wherein a definition of the summary table is based on a full select statement, including, but not limited to, a derived table involving nested GROUP BY operations and complex HAVING clauses with subqueries or joins, that is materialized in the table and describes how the summary table was derived. A query is analyzed using subsumption tests between the query and the definition of the summary table (that is, a query by itself) to determine whether expressions occurring anywhere in the query, but not in the summary table, can be derived using the content in the summary table, and hence the query is subsumed by the summary table definition An expression in the query is subsumed by and compensated by the summary table when the expression can be re-derived from one or more of the columns of the summary table.

It is an object of the present invention to optimize queries using summary tables storing materialized views. More specifically, it is an object of the present invention to make RDBMS software aware how a result in a summary table was derived, so that an optimizer function of the RDBMS software can use the summary tables to respond to queries. The techniques presented in the present invention involve complex and yet efficient subsumption tests among queries and are directly applicable to other areas such as multiple query optimization.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
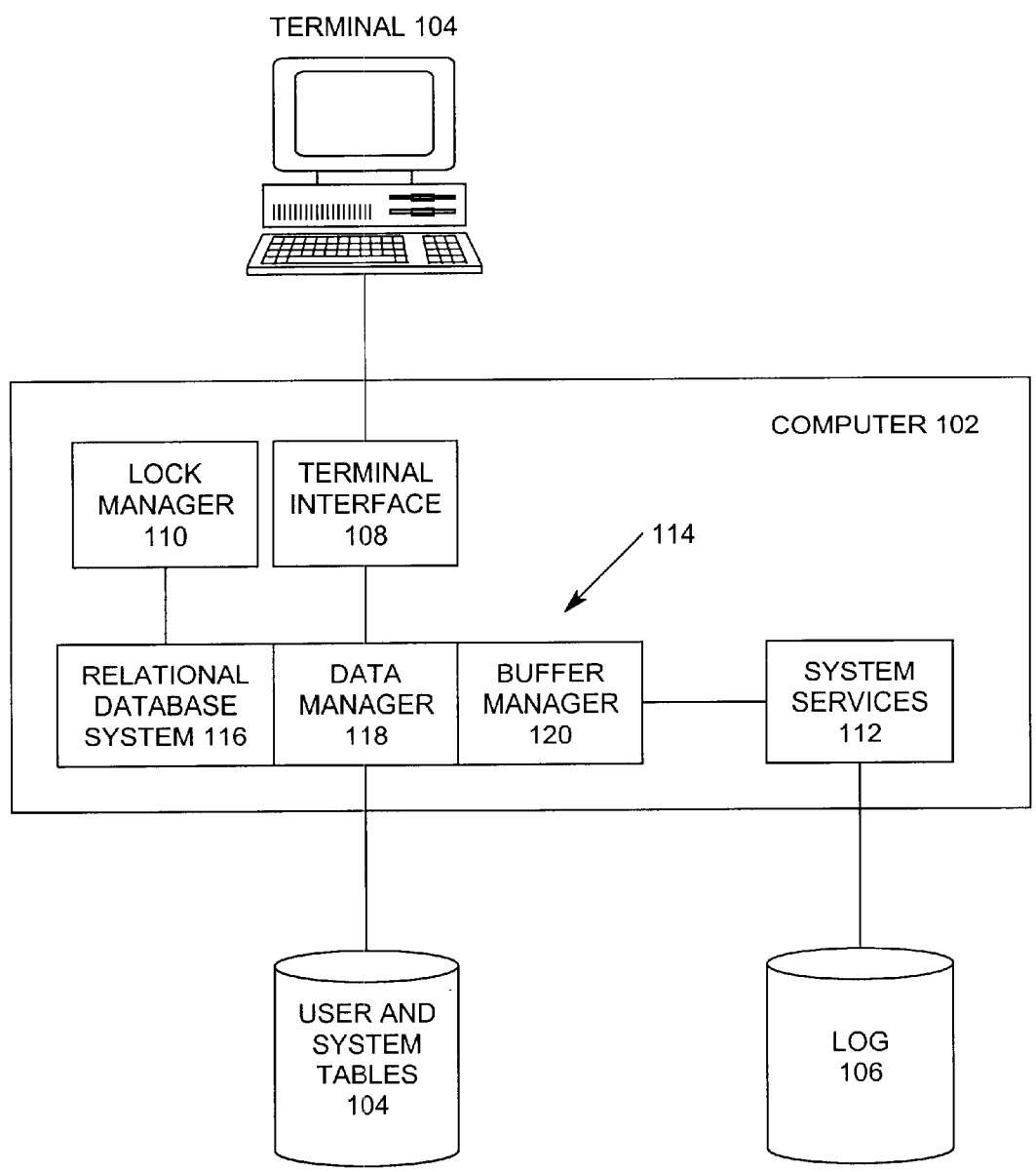
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more data storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software.

As illustrated in FIG. 1, the DB2 product includes three major components: the Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the heart of the DB2 architecture is the Database Services module 114. The Database Services module 114 contains several submodules, including the Relational Database System (RDS) 116, the Data Manager 118, and the Buffer Manager 120, as well as other elements such as an SQL compiler/interpreter. These submodules support the functions of the SQL language, i.e., definition, access control, retrieval, and update of user and system data.

Generally, each of the components, modules, and submodules of the RDBMS software comprise instructions and/or data, and are embodied in or retrievable from a computer-readable device, medium, or carrier, e.g., a memory, a data storage device, a remote device coupled to the computer 102 by a data communications device, etc. Moreover, these instructions and/or data, when read, executed, and/or interpreted by the computer 102, cause the computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Interactive SQL Execution

Figure 2:
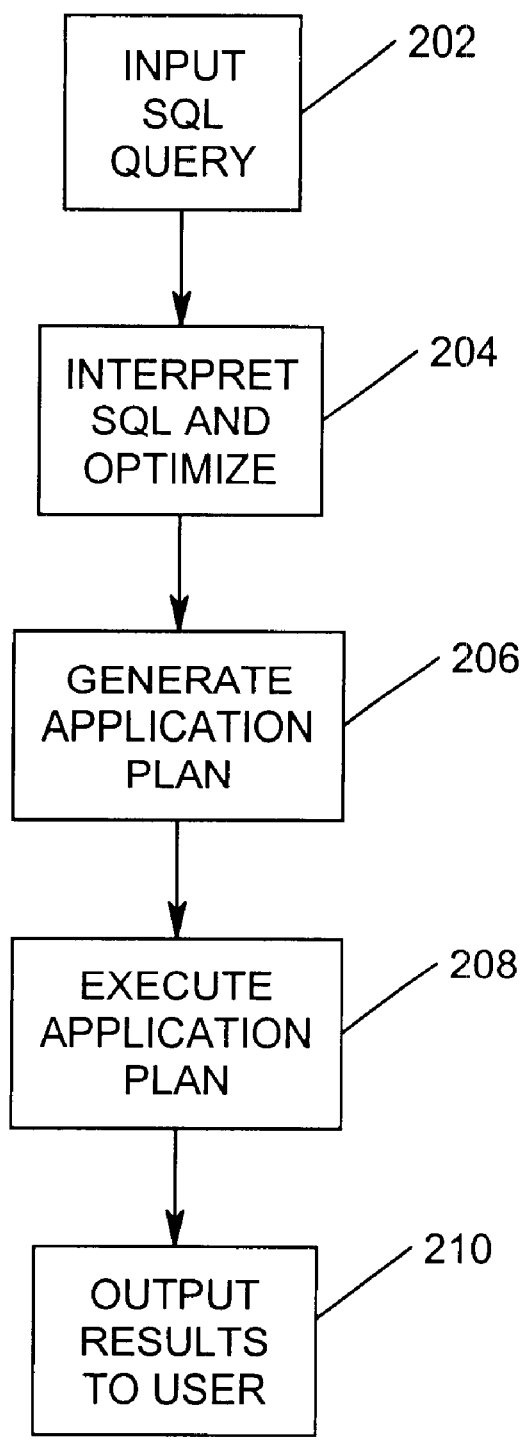
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102. Block 204 represents the step of compiling or interpreting the SQL statements. An optimization function within block 204 may transform or optimize the SQL query in a manner described in more detail later in this specification. Block 206 represents the step of generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan and Block 210 represents the output of the results.

Embedded/Batch SQL Execution

Figure 3:
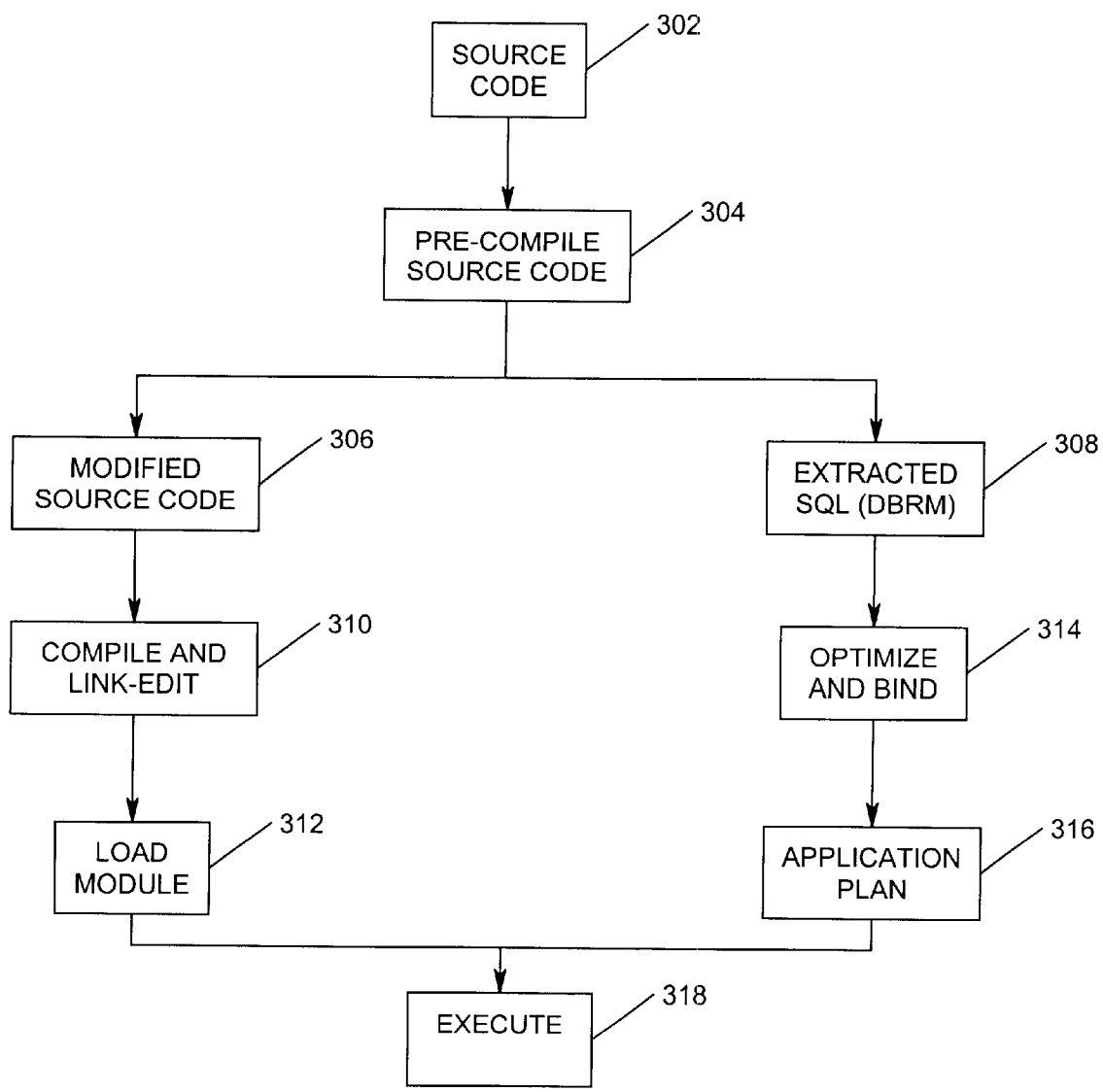
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retrieve the data. The optimize and bind step 314 may optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Description of the Optimization Technique

The present invention discloses an improved optimization technique that is typically performed at step 204 of FIG. 2 or step 314 of FIG. 3. Specifically, the present invention discloses an improved SQL query compilation and optimization technique using Query Graph Model (QGM).

A QGM represents a semi-procedural dataflow graph of a query, wherein the QGM is basically a high-level, graphical representation of the query. Boxes are used to represent relational operations, while arcs between boxes are used to represent quantifiers, i.e., table references. Each box includes the predicates that it applies, an input or output order specification (if any), a distinct flag, and so on. The basic set of boxes include those for SELECT, GROUP BY, and UNION. A join operation is represented by a SELECT box with two or more input quantifiers, while an ORDER BY operation is represented by a SELECT box with an output order specification.

Many SQL query compilation and optimization techniques using the Query Graph Model (QGM) have been performed in the prior art, as disclosed in the publication, Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, which is incorporated by reference herein.

The operation of the present invention can best be understood in context, i.e., using a real-world example, such as a data warehouse application performed by the RDBMS software. Consider a credit card company storing credit card customer information, their credit card accounts, and transactions that customers made using credit cards for purchases.

Figure 4:
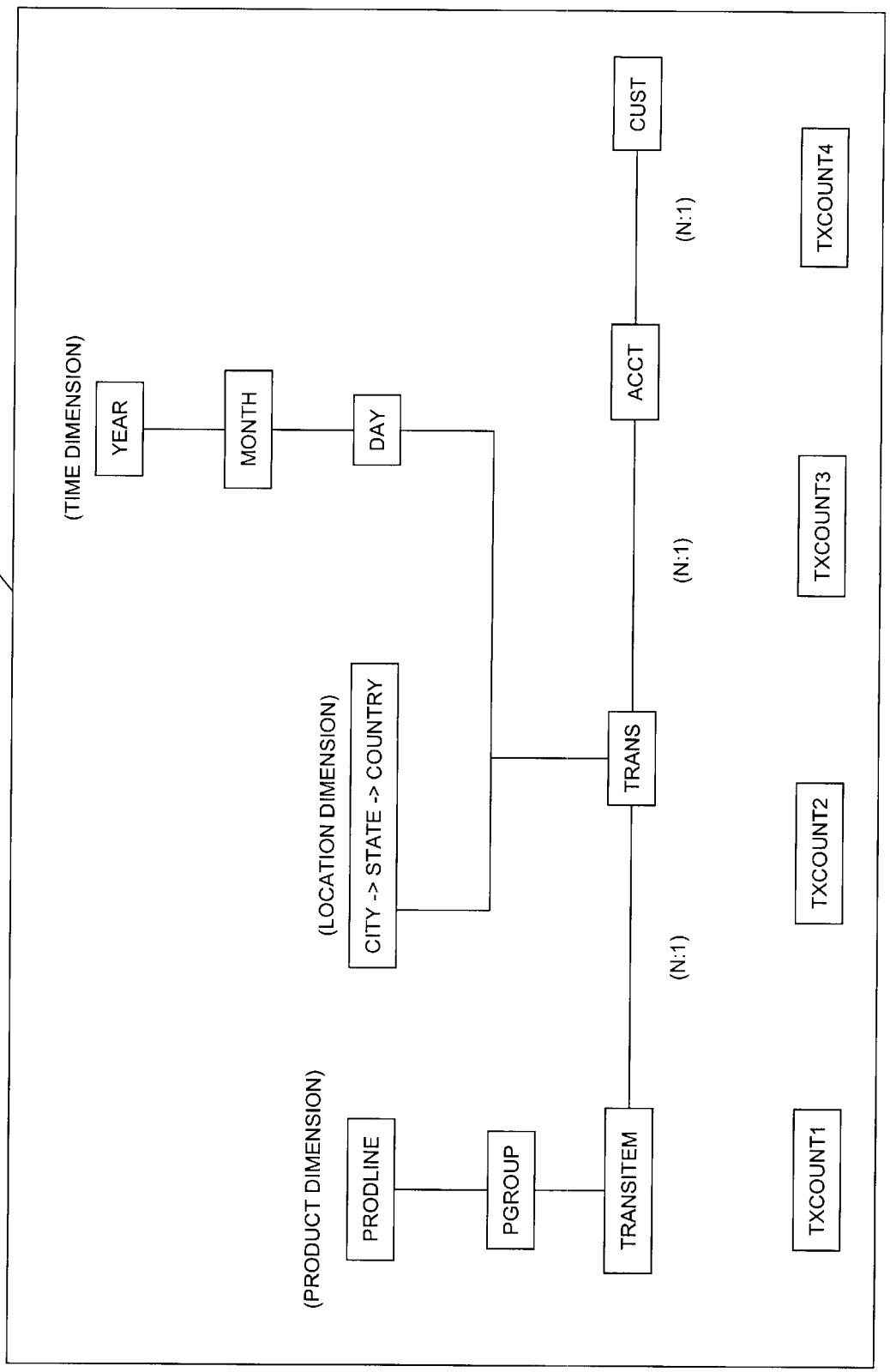
FIG. 4 is a block diagram that illustrates a star schema for a relational database.

A possible database schema, comprising a "star" schema, is illustrated by FIG. 4 and described below:

Table CUST contains customer information.
Table ACCT contains credit card account information. Each customer may have one or more credit cards (i.e., one or more accounts).
Table TRANS contains transaction information. A customer may make a number of purchases using a particular credit card, and the transaction information is stored in table TRANS. Each transaction was made at a particular time and in a particular store. The purchase time and location can be aggregated along time and location dimensions.
Table PRODLINE contains information about product lines and table PGROUP contains product category information.
Table TRANSITEM contains information about transactions on each item. In each transaction, any number of items may be purchased, and TRANSITEM stores this information and the product information can be aggregated along the product line hierarchy.

The following "CREATE TABLE" statements may be used to create the tables shown in FIG. 4.

Figure 5A:
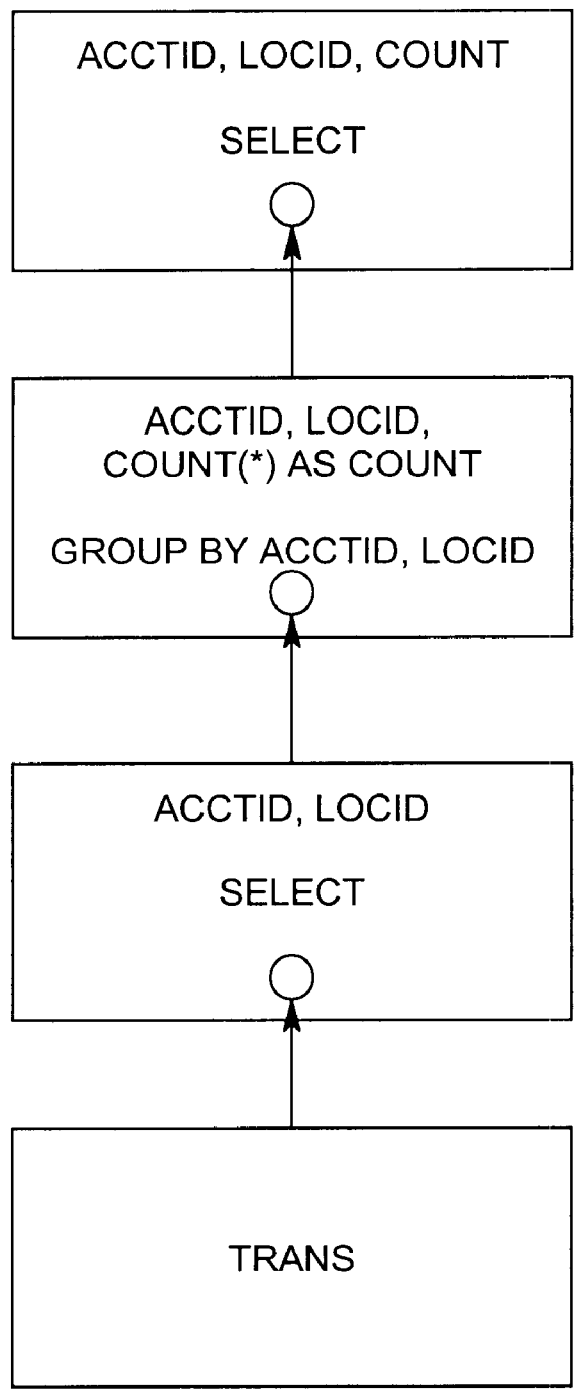
FIGS. 5A, 5B, and 5C are block diagrams of Query Graph Model representations that illustrate various SQL statements.
Figure 5B:
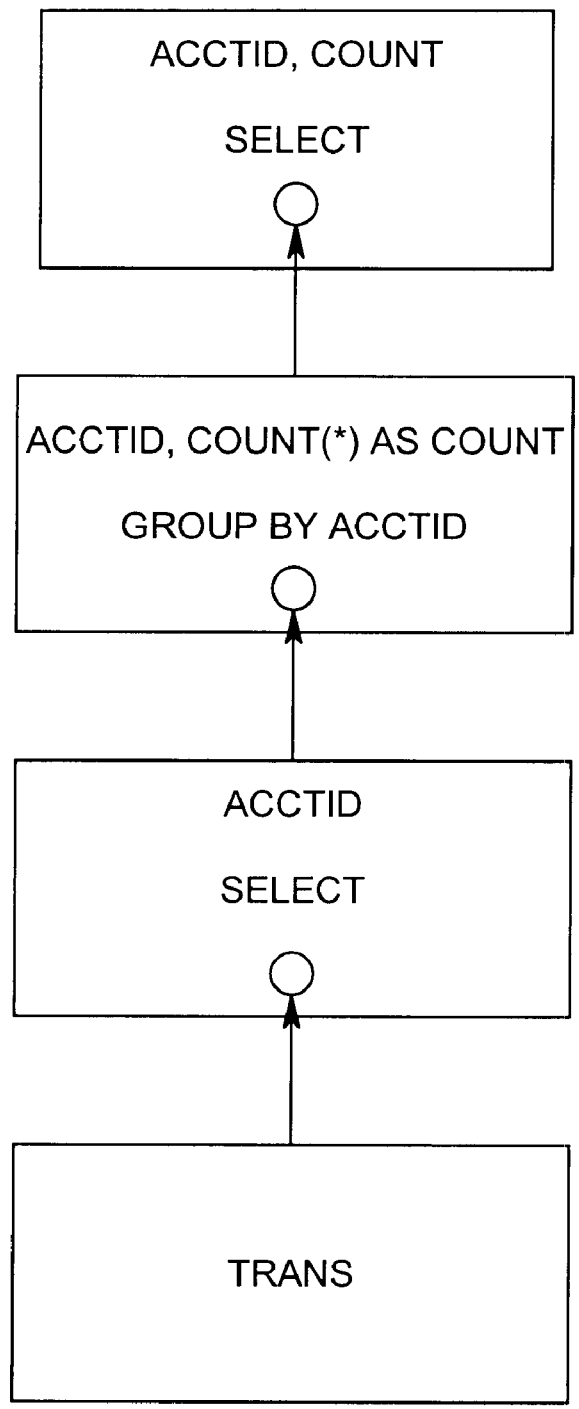

CREATE TABLE CUST(
  ID INT NOT NULL PRIMARY KEY,
  MARITAL_STATUS CHAR(1),
  INCOME_RANGE INT NOT NULL,
  ZIPCODE INT,
  RESIDENCE VARCHAR(5));

CREATE TABLE ACCT(
  ID INT NOT NULL PRIMARY KEY,
  CUSTID INT NOT NULL,
  CONSTRAINT CUST_ACCT FOREIGN KEY
    (CUSTID)
    REFERENCES CUST);

CREATE TABLE LOC(
  ID INT NOT NULL PRIMARY KEY,
  CITY VARCHAR(10),
  STATE CHAR(2),
  COUNTRY VARCHAR(10));

CREATE TABLE TRANS(
  ID INT NOT NULL PRIMARY KEY,
  ACCTID INT NOT NULL,
  PDATE DATE NOT NULL,
  STATUS VARCHAR(15),
  LOCID INT NOT NULL,
  CONSTRAINT ACCT_TRANS FOREIGN KEY
    (ACCTID)
    REFERENCES ACCT,
  CONSTRAINT LOC_ACCT FOREIGN KEY
    (LOCID)
    REFERENCES LOC);

CREATE TABLE PRODLINE(
  ID INT NOT NULL PRIMARY KEY,
  NAME VARCHAR(20));

CREATE TABLE PGROUP(
  ID INT NOT NULL PRIMARY KEY,
  NAME VARCHAR(12),
  LINEID INT NOT NULL,
  CONSTRAINT PRODLINE_PGROUP FOREIGN
    KEY (LINEID)
    REFERENCES PRODLINE);

CREATE TABLE TRANSITEM(
  ID INT NOT NULL PRIMARY KEY,
  TRANSID INT NOT NULL,
  AMOUNT DECIMAL(10,2) NOT NULL,
  PGID INT NOT NULL,
  CONSTRAINT TRANS_TRANSITEM FOREIGN
    KEY
    (TRANSID) REFERENCES TRANS,
  CONSTRAINT PGROUP_TRANSITEM FOREIGN
    KEY (PGID)
    REFERENCES PGROUP);

With these base tables populated with data, one or more summary tables or materialized views can be created in the database that keep the number of transactions for each account and location. The following "CREATE TABLE" statement may be used to define one of the summary tables:

CREATE TABLE TXCOUNT1 AS (
      SELECT ACCTID, LOCID, COUNT(*) AS COUNT
      FROM TRANS
      GROUP BY ACCTID, LOCID);

Consider a query that returns the number of transactions for each account:

Q1: SELECT ACCTID, COUNT(*)
      FROM TRANS
      GROUP BY ACCTID;

The Query Graph Model representation for the summary table definition is depicted in FIG. 5A and the Query Graph Model representation for the query Q1 is depicted in FIG. 5B.

Figure 5C:
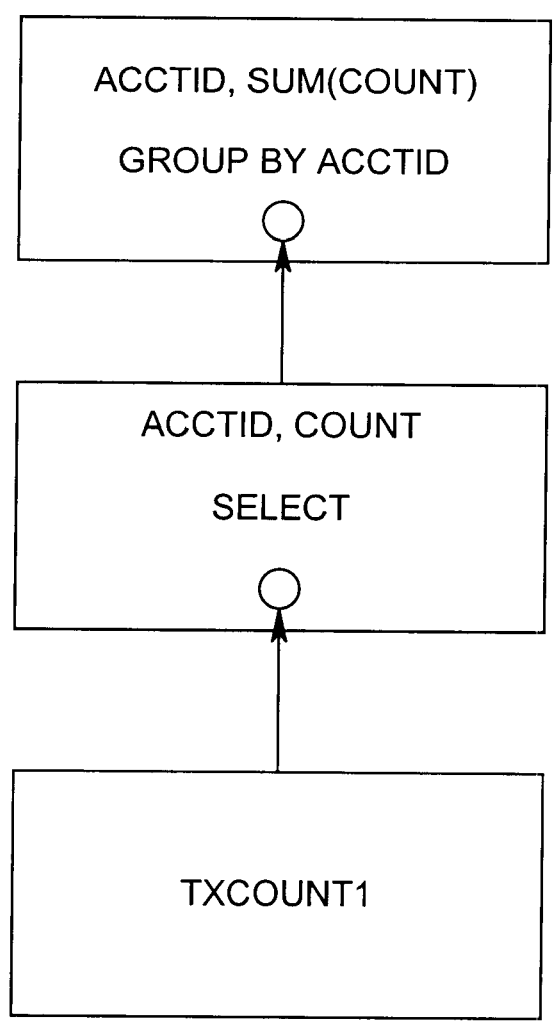

An optimizer can reroute the query Q1 using a query block by query block approach as follows:

NEW Q1: SELECT ACCTID, SUM(COUNT)
      FROM TXCOUNT1
      GROUP BY ACCTID;

The Query Graph Model representation for NEW Q1 is depicted in FIG. 5C. Notice that the new query further summarizes the summary table by computing the SUM of its COUNTs. It is well know in the prior art that this technique can be applied whenever the aggregate computation is an algebraic function. Commonly supported functions are SUM, COUNT and AVERAGE. Note that the summary table must contain computations (called partial aggregations) that can be combined to compute the original queries computation (final aggregation). For SUM and COUNT, the partial aggregation is the aggregate value itself, but for AVERAGE, the COUNT or SUM must also exist in the summary table for this technique to be applied.

The following is an example where the above-mentioned query block by query block subsumption and compensation approach fails, i.e., it produces the wrong answer set by rerouting the query to the summary table.

Figure 6A:
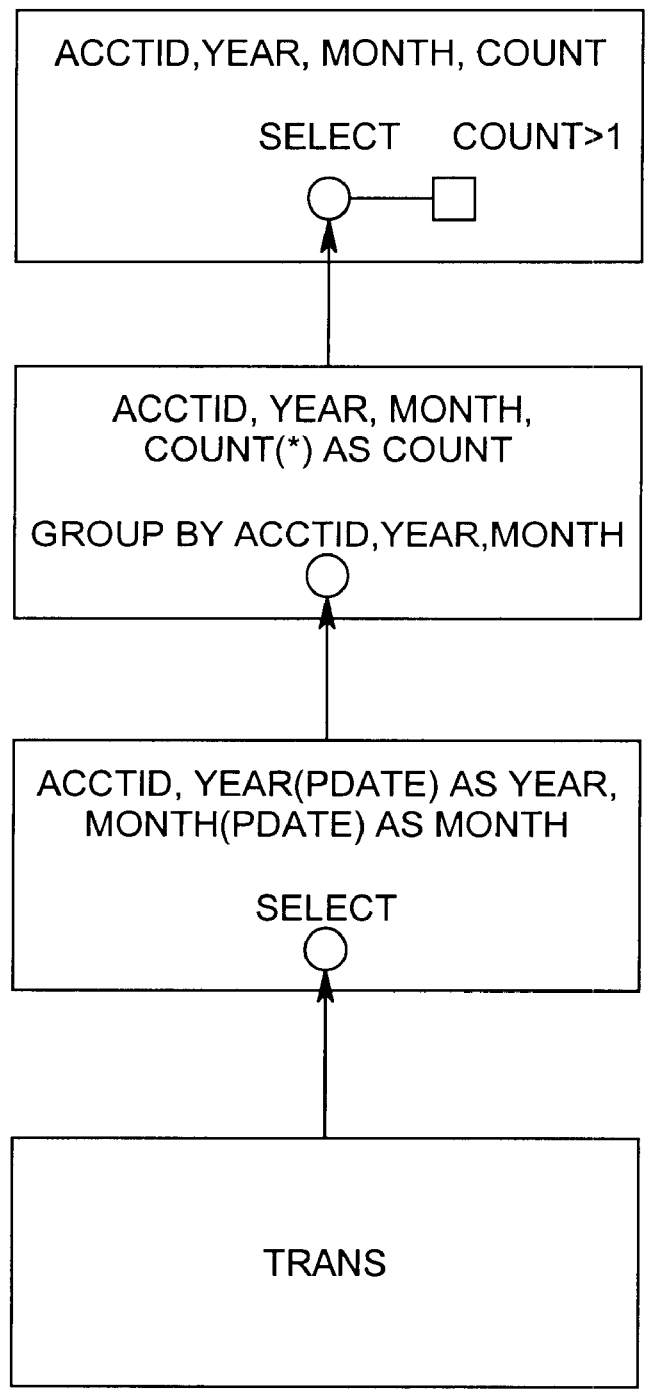
FIGS. 6A and 6B are block diagrams of Query Graph Model representations that illustrate various SQL statements.
Figure 6B:
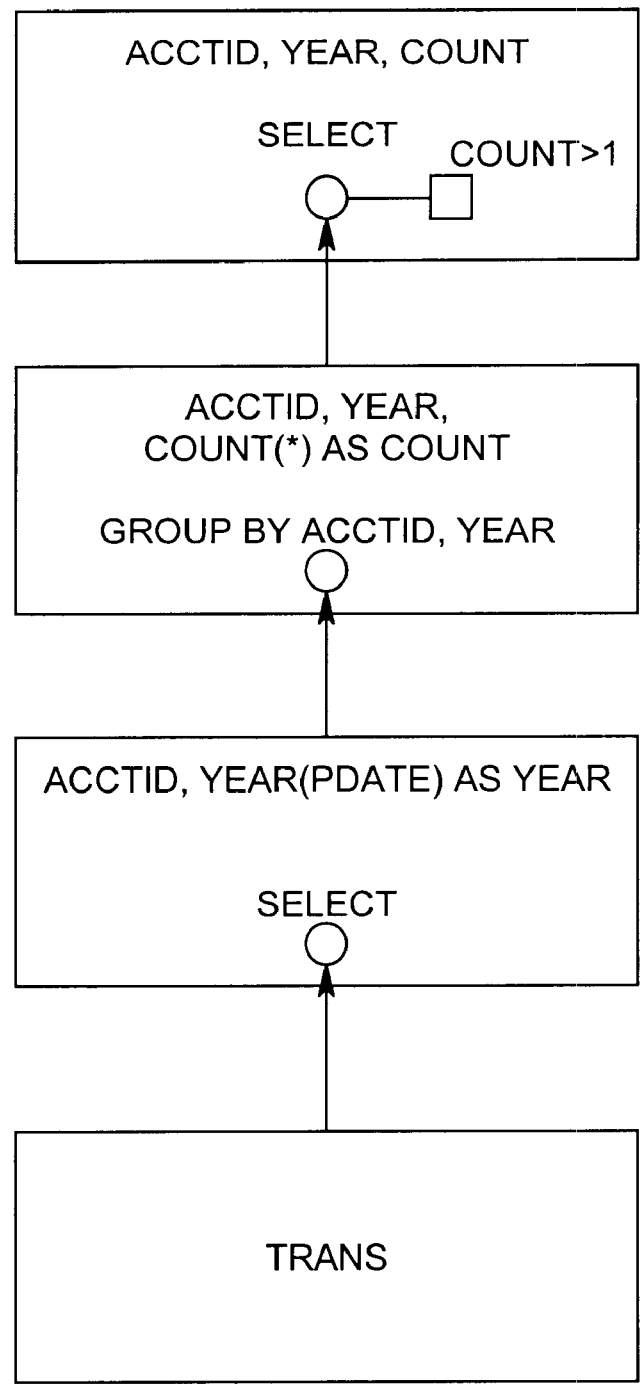

Consider the following summary table definition which stores the transaction count for those accounts that purchased less than five items. The following "CREATE TABLE" statements may be used to define the summary table:

CREATE TABLE TXCOUNT2 AS (
      SELECT ACCTID, YEAR(PDATE) AS YEAR,
        MONTH(PDATE)
        AS MONTH, COUNT(*) AS COUNT
      FROM TRANS
      GROUP BY ACCTID, YEAR(PDATE), MONTH
        (PDATE)
      HAVING COUNT(*)>1)

and the following query:

Q2: SELECT ACCTID, YEAR(PDATE), COUNT(*)
      FROM TRANS
      GROUP BY ACCTID, YEAR(PDATE)
      HAVING COUNT(*)>1;

The Query Graph Model representations for the summary table definition and the query Q2 are shown in FIG. 6A and FIG. 6B, respectively.

In the example, the query Q2 cannot be rerouted to the summary table TXCOUNT2. Although the query and the summary table have syntactically the same HAVING clause, they are not semantically the same. The aggregate value of COUNT in the summary table is the number of tuples in each unique grouping of ACCTID, YEAR(PDATE) and MONTH(PDATE), whereas the aggregate value of COUNT in the query is the number of tuples in each unique grouping of ACCTID and YEAR(PDATE).

Given the following values, for ACCTID, YEAR (PDATE) and MONTH(PDATE):

| ACCTID | YEAR(PDATE) | MONTH(PDATE) |
|--------|-------------|--------------|
| 1      | 1           | 1            |
| 1      | 1           | 1            |
| 1      | 1           | 1            |
| 1      | 1           | 2            |

The summary table (TXCOUNT2) contains the tuples shown:

| ACCTID | YEAR | MONTH | COUNT |
|--------|------|-------|-------|
| 1      | 1    | 1     | 3     |

In contrast, the same values for ACCTID, YEAR(PDATE) and MONTH(PDATE), the query Q2 produce the following results:

| ACCTID | YEAR | COUNT |
|--------|------|-------|
| 1      | 1    | 4     |

Looking at this scenario, it can be seen that the predicate "COUNT>1" is applied after the grouping has been applied. Hence, the aggregate COUNT is semantically not the same in the query and the summary table. This causes the summary table to lose information; specifically, the grouping ACCTID=1, YEAR=1, MONTH=2, COUNT=1, which is necessary to produce the correct query result, COUNT=4, is lost. Therefore, the summary table definition does not subsume the query because the query results can never be derived from the contents of the summary table.

Figure 7A:
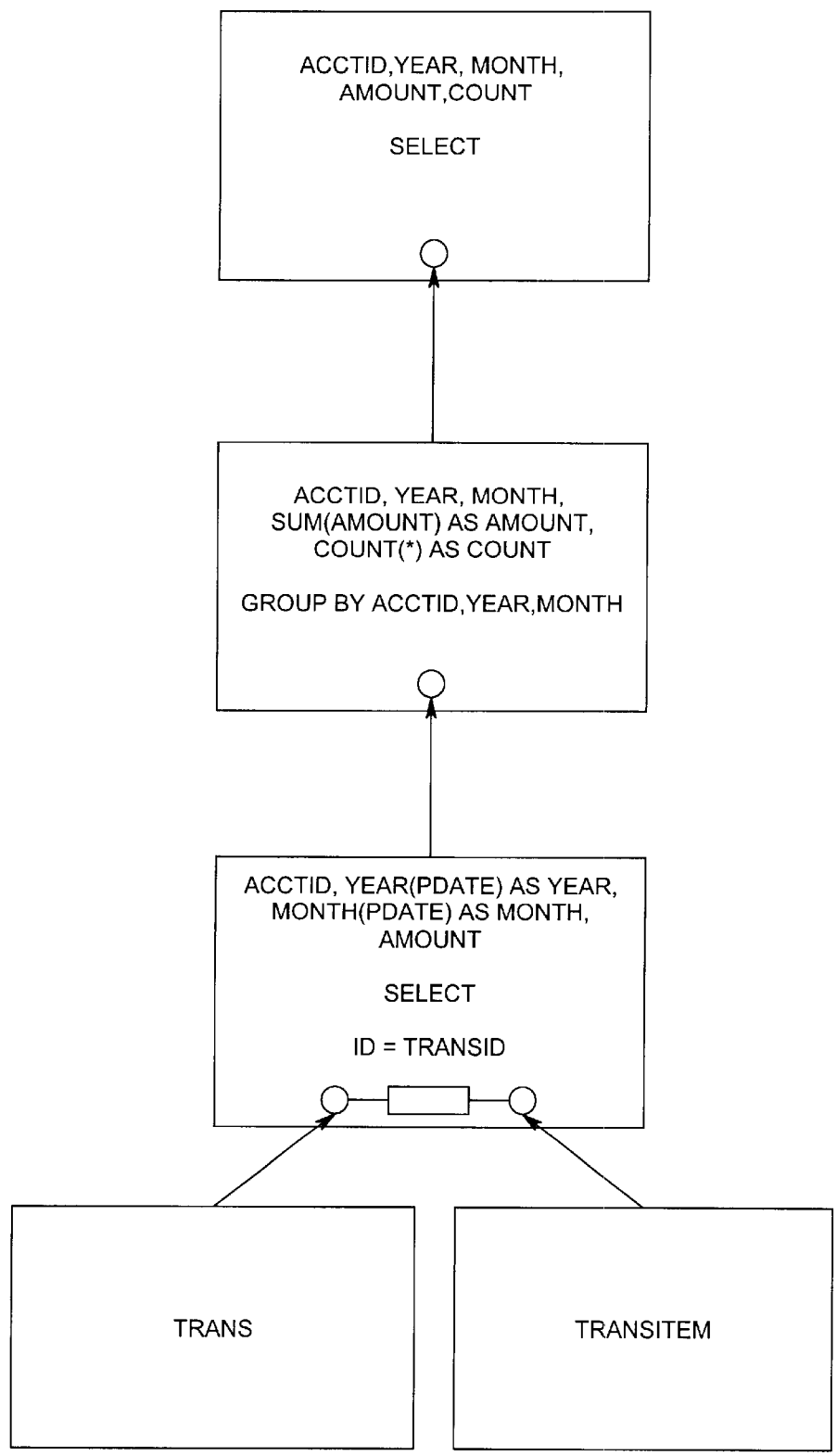
FIGS. 7A, 7B, 7C, 7D, and 7E are block diagrams of Query Graph Model representations that illustrate various SQL statements.
Figure 7B:
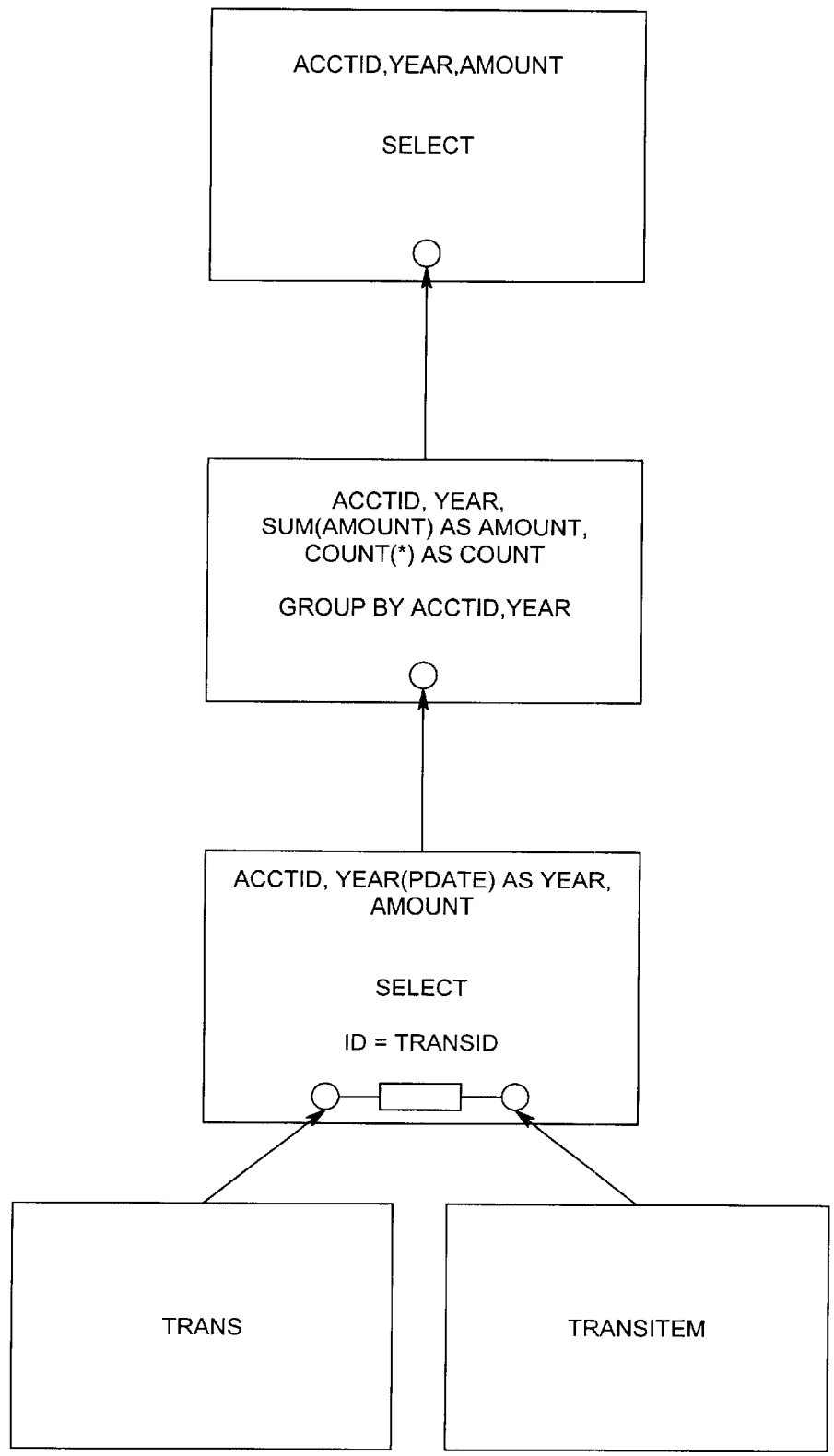

Following is an example where the proposed approach in the preferred embodiment of the present invention can recognize and compensate complex expressions when the query is rerouted to summary tables. The following "CREATE TABLE" statements may be used to define the summary table that stores the transaction total and number of transactions for each account, for each year and for year month:

CREATE TABLE TXCOUNT3 AS (
      SELECT ACCTID, YEAR(PDATE) AS YEAR,
        MONTH(PDATE)
        AS MONTH, SUM(AMOUNT) AS AMOUNT,
          COUNT(*)
        AS COUNT
      FROM TRANS, TRANSITEM
      WHERE TRANS.ID=TRANSITEM.TRANSID
      GROUP BY ACCTID, YEAR(PDATE), MONTH
        (PDATE));

The following query Q3 returns for each account its yearly total purchases for those years after 1990:

Q3: SELECT ACCTID, YEAR(PDATE), SUM (AMOUNT)
   FROM TRANS, TRANSITEM
   WHERE TRANS.ID=TRANSITEM.TRANSID
   AND YEAR(PDATE)>1990
   GROUP BY ACCTID, YEAR(PDATE);

The Query Graph Model representations for the summary table definition and the query Q3 are shown in FIG. 7A and FIG. 7B, respectively.

Figure 7C:
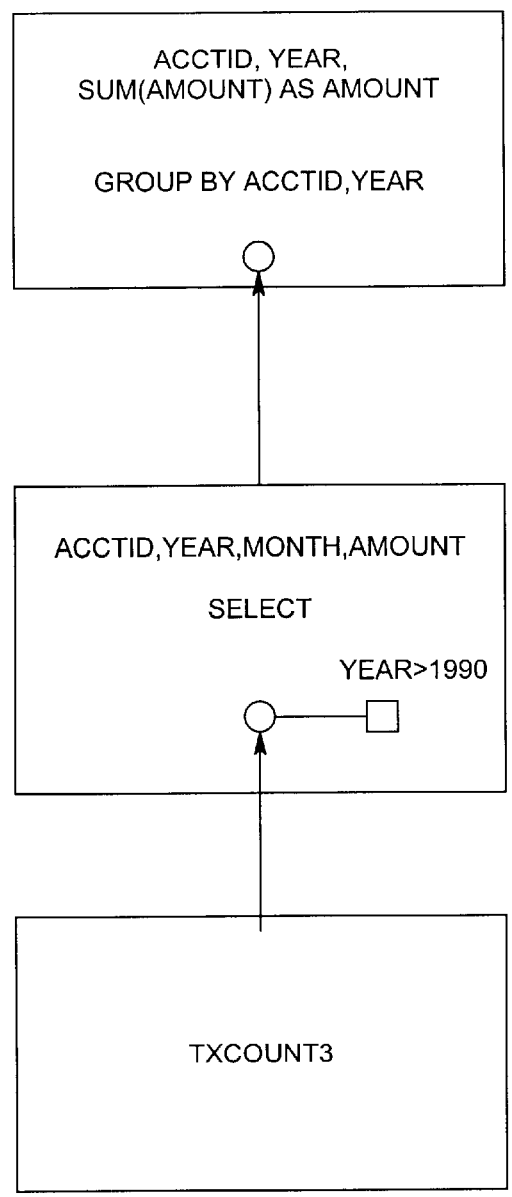

The new rerouted query would take the form of the following:

NEW Q3: SELECT ACCTID, YEAR, SUM(AMOUNT) AS AMOUNT
   FROM TXCOUNT3
   WHERE YEAR>1990
   GROUP BY ACCTID, YEAR;

The Query Graph Model representation for the rerouted query NEW Q3 is shown in FIG. 7C.

The rerouting steps performed by the RDBMS software are able to determine if complex expressions, such as "YEAR(PDATE)>1990", occurring anywhere in the query, but not in the summary table, can be subsumed. The case where the complex expression is found in both the query and the summary table is trivially subsumed.

Any query expression is subsumed if the expression can be re-derived from the columns of the summary table. In this example, the RDBMS software is able to detect that "YEAR (PDATE)>1990" is not applied in the summary table. By maintaining context and information about the derivation of columns in the summary table, the RDBMS software is able to recognize that, although the base table column, PDATE, does not survive the summary table, the expression YEAR (PDATE) does. Therefore, the complex expression "YEAR (PDATE)>1990" is subsumed since 1990 is recognized as a constant and can always be derived. Had PDATE and not YEAR(PDATE) survived the summary table, the proposed approach would still recognize that the expression YEAR (PDATE) is re-derivable and hence the predicate YEAR (PDATE)>1990 can be evaluated based solely on the values in the summary table.

Expressions can become arbitrarily complex and the rerouting steps performed by the RDBMS software will always find the largest matching sub-expressions from which the complex expression can be re-derived. For example, if PDATE did survive the summary table, the complex expression will still be re-derived from YEAR (PDATE), even though using PDATE is a viable alternative and would be chosen had YEAR(PDATE) not survived.

Re-deriving the expression from YEAR(PDATE) avoids recomputing the expression and is more efficient. Furthermore, since the approach of the preferred embodiment of the present invention works across multiple query blocks, the wrong derivation in a lower query block that does not survive the multiple query blocks is not selected.

In another example, when the summary table contains SUM(X) and COUNT(X), and the query contains AVG(X), then the expression AVG(X) can be compensated by SUM/ COUNT, wherein SUM and COUNT are columns from the summary table that compute SUM(X) and COUNT(X), respectively.

Figure 7D:
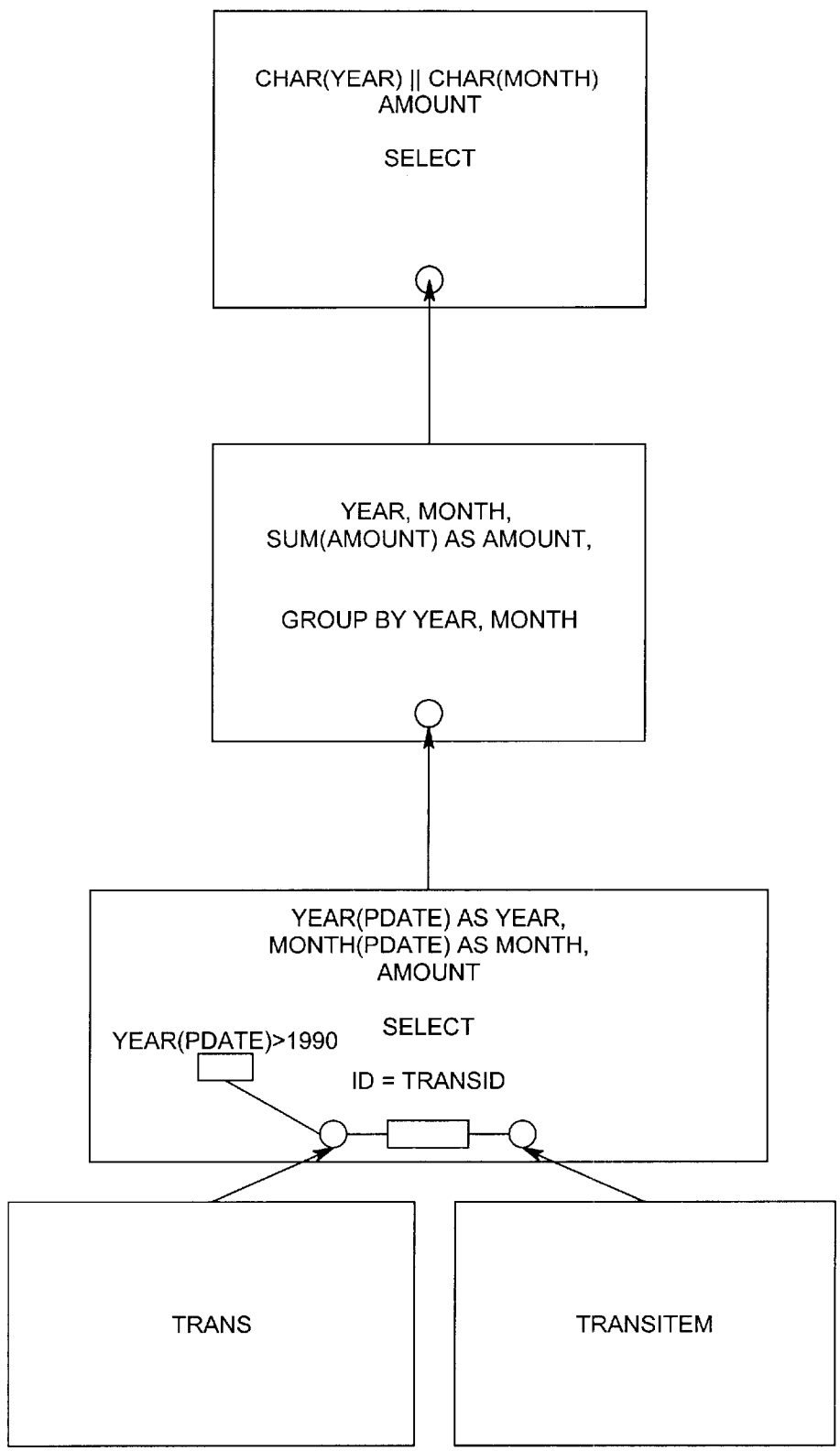
Figure 7E:
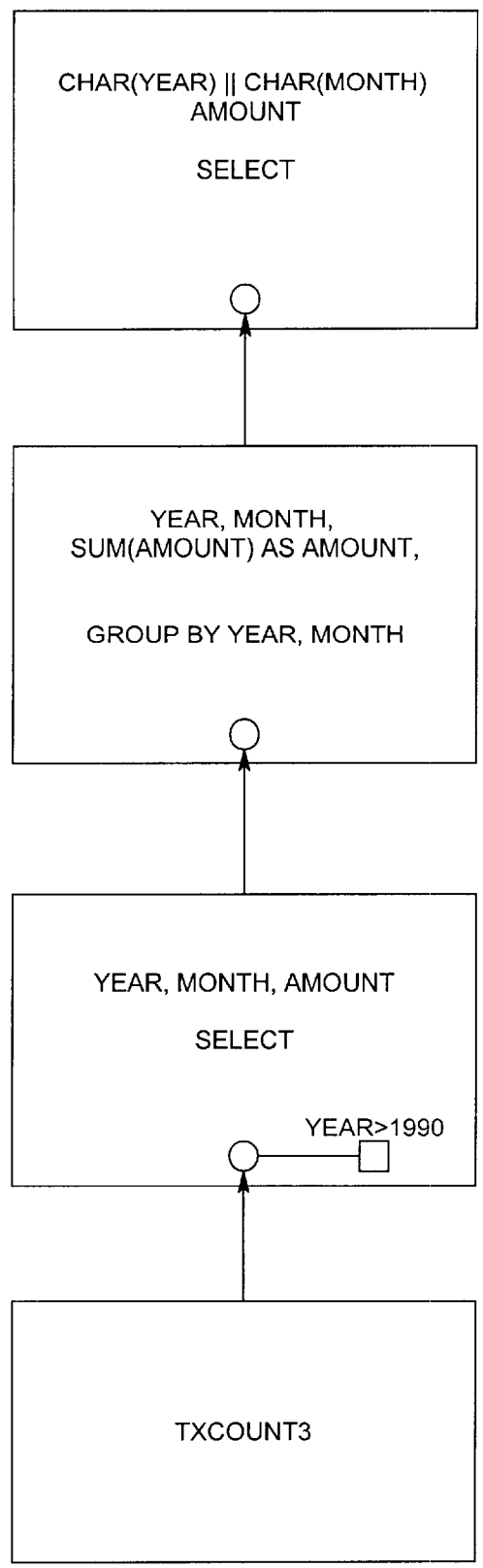

The following query Q4 is another example that demonstrates how complex expressions can be rerouted and compensated:

Q4: SELECT CHAR(YEAR(PDATE))||CHAR(MONTH (PDATE)),
   SUM(AMOUNT)
   FROM TRANS, TRANSITEM
   WHERE TRANS.ID=TRANSITEM.TRANSID AND
   YEAR(PDATE)>1990
   GROUP BY YEAR(PDATE), MONTH(PDATE);

The Query Graph Model representation for Q4 is shown in FIG. 7D and its corresponding rerouted/compensated query is shown in FIG. 7E using the summary table TXCOUNT3.

Figure 8A:
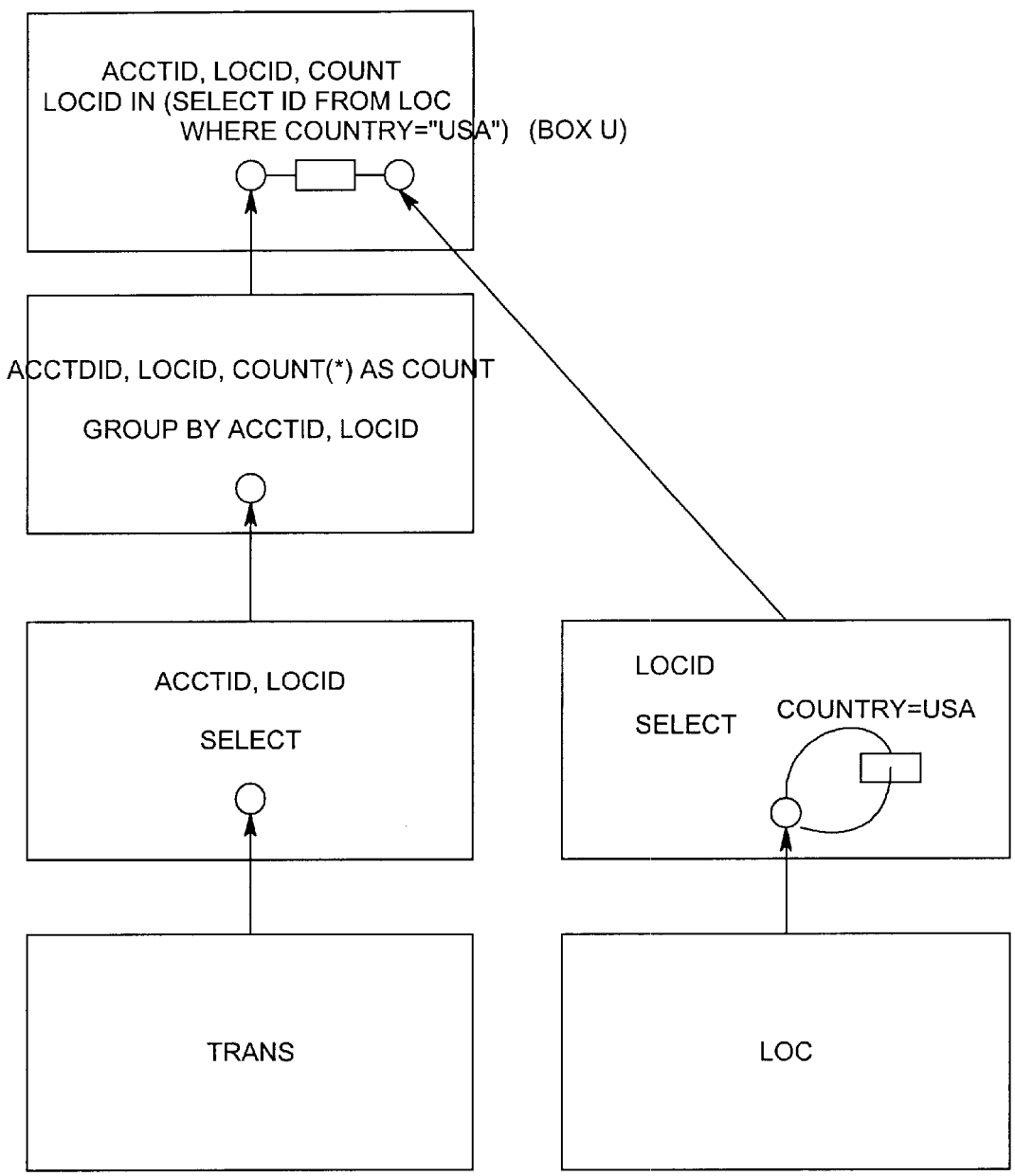
FIGS. 8A, 8B, and 8C are block diagrams of Query Graph Model representations that illustrate various SQL statements.
Figure 8B:
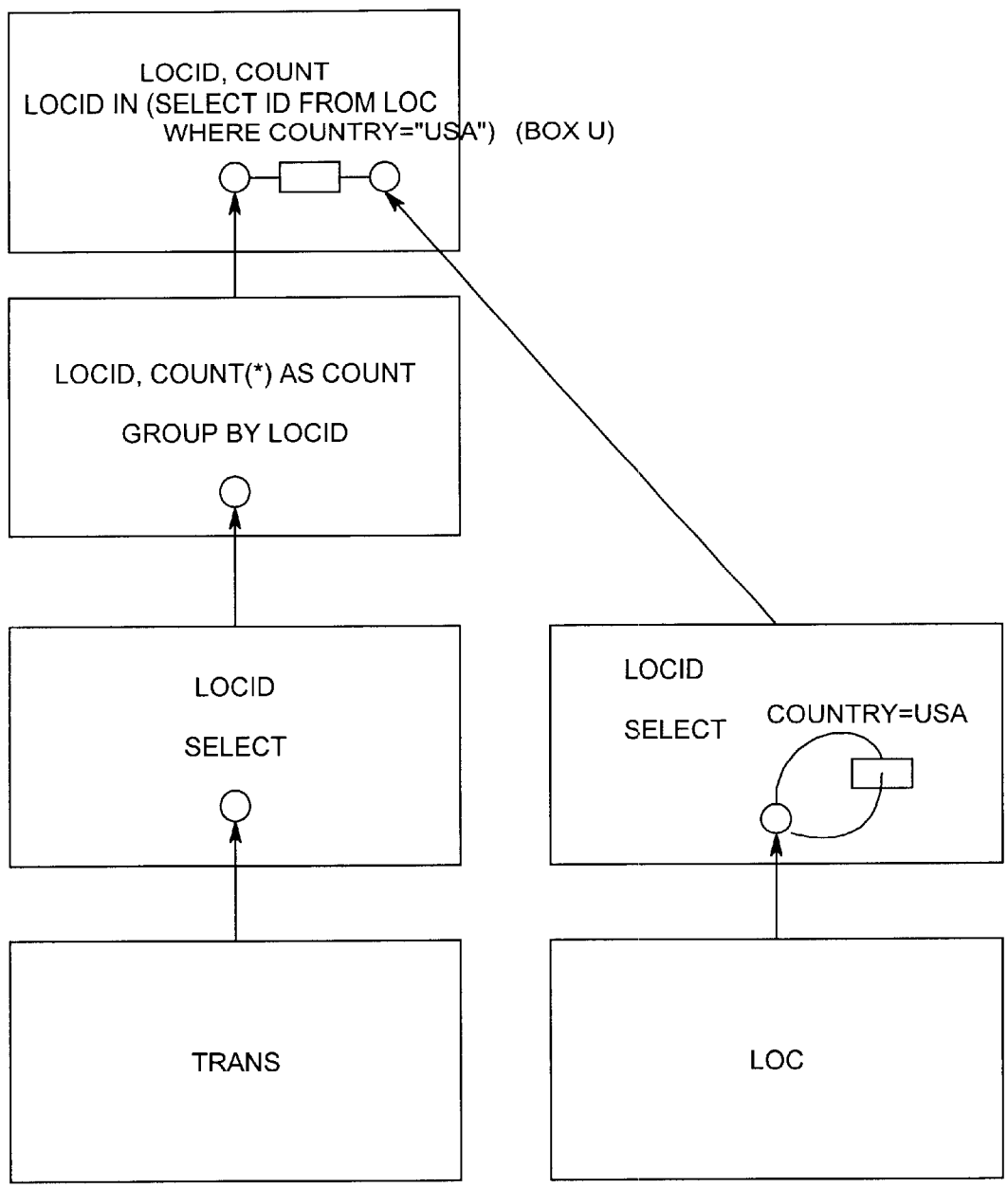

Following is an example where the proposed approach in the preferred embodiment of the present invention can reroute the query to summary tables when there is a join or a subquery after the compensation of a GROUP BY operation. The following "CREATE TABLE" statements may be used to define the summary table that stores the transaction total and number of transactions for each account and USA locations:

CREATE TABLE TXCOUNT4 AS (
   SELECT ACCTID, LOCID, COUNT(*) AS COUNT
   FROM TRANS
   GROUP BY ACCTID, LOCID
      HAVING LOCID IN (SELECT ID
         FROM LOC
         WHERE COUNTRY='USA'));

Consider a query which returns the number of transactions for each USA location:

Q5: SELECT LOCID, COUNT(*)
   FROM TRANS
   GROUP BY LOCID
   HAVING LOCID IN (SELECT ID
      FROM LOC
      WHERE COUNTRY='USA');

The Query Graph Model representation for the summary table definition is depicted in FIG. 8A and the Query Graph Model representation for the query Q5 is depicted in FIG. 8B.

Figure 8C:
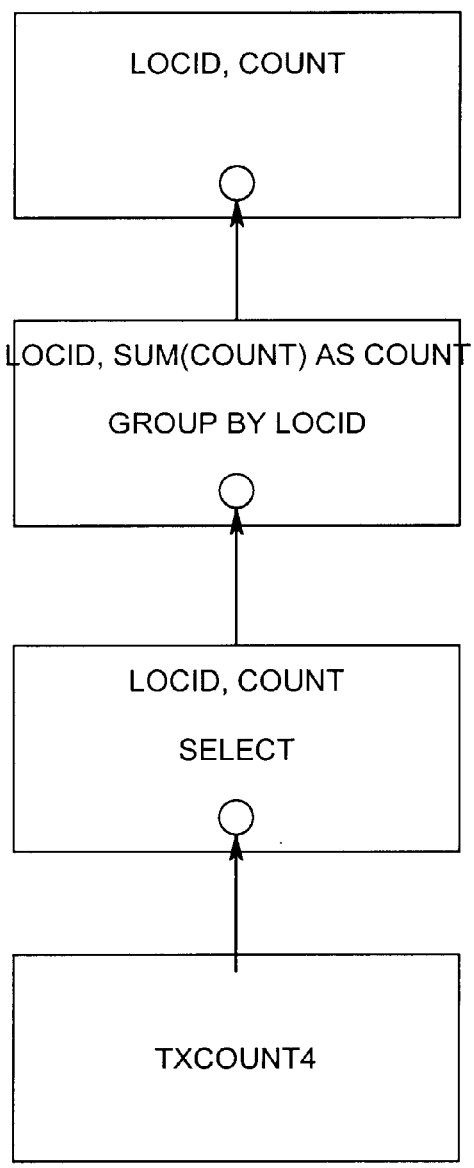

An optimizer can reroute the query Q5 as follows:

NEW Q5: SELECT LOCID, SUM(COUNT)
   FROM TXCOUNT4
   GROUP BY LOCID;

The Query Graph Model representation for NEW Q5 is depicted in FIG. 8C. Note that there is an existential subquery in the QGM box (U) in the summary table definition (FIG. 8A) and existential subqueries do not increase the number of rows produced by the GROUP BY box below. For this reason, the query can be safely rerouted to the summary table and a compensation on can be performed on the GROUP BY operation by grouping on a subset of items as shown in FIG. 8C. This optimization can be applied when the subquery is a universal subquery or a scalar subquery.

Consider the situation where the subquery is transformed into a join operation. The join column from the table LOC is the primary key (ID) and thus the join is N-to-1 from the GROUP BY operation to the table LOC. Hence, the join operation does not increase the number of rows produced by the GROUP BY operation.

Prior art in this field has focused on subsumption involving only a single query block. For complex query analysis, there is a need to handle multiple query blocks simultaneously.

Figure 9A:
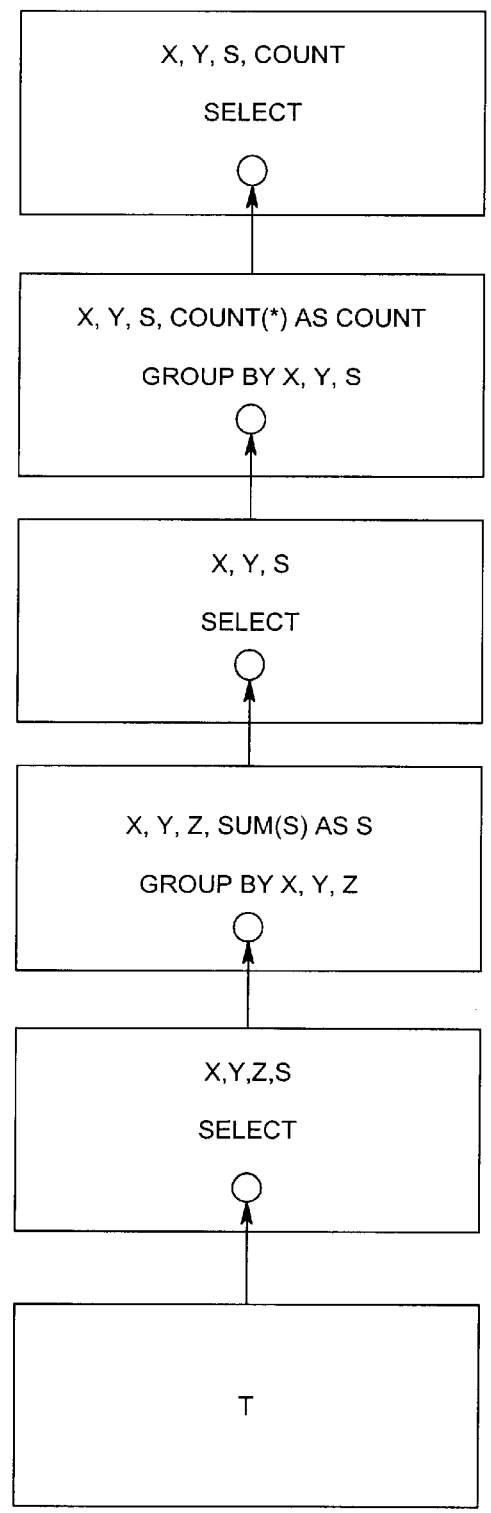
FIGS. 9A and 9B are block diagrams of Query Graph Model representations that illustrate various SQL statements.
Figure 9B:
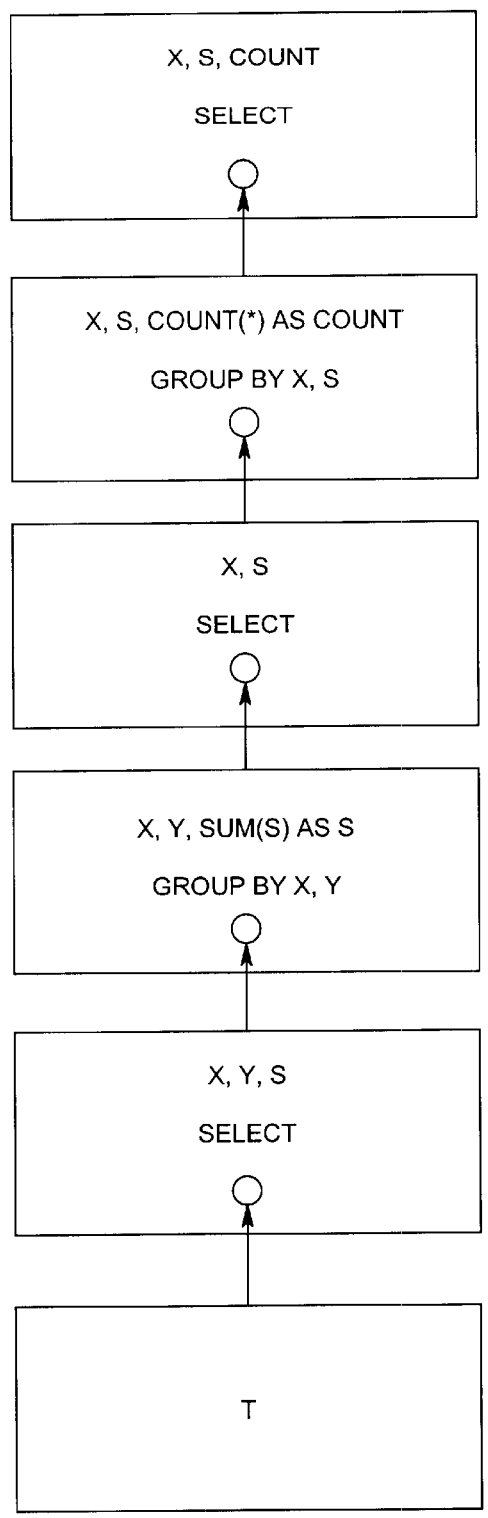

To illustrate this point, consider the following generic example involving a table T:

CREATE TABLE T (X INT, Y INT, Z INT, S FLOAT);

and the following summary table:

CREATE TABLE MULTI_BLOCKS AS
  (SELECT X, Y, S, COUNT(*) as COUNT
  FROM TABLE (SELECT X, Y, Z, SUM(S) AS S
    FROM T
    GROUP BY X, Y, Z) AS Q(X,Y,Z,S)
  GROUP BY X, Y, S);

and the query Q6:

Q6: SELECT X, S, COUNT(*) as COUNT
  FROM TABLE (SELECT X, Y, SUM(S) AS S
    FROM T
    GROUP BY X, Y) AS Q(X,Y,S)
  GROUP BY X, S;

The Query Graph Model representations for the summary table definition and query Q6 are shown in FIG. 9A and FIG. 9B respectively.

A query block by query block approach would incorrectly determine that query Q6 can be subsumed by the summary table definition (MULTI_BLOCKS). However, the approach presented here correctly determines that Q6 cannot be subsumed by the summary table definition MULTI_BLOCKS). By understanding context and information on derived columns, the approach presented here has the ability to properly determine subsumption of multiple block queries.

In this particular case, the query is not subsumed by the summary table because the group by columns of the query is not a subset of the group by columns of the summary table. It references the aggregate value SUM, which is not a substitution with the summary table.

Once a query block is processed which has different, but subsumable, tuple groups, any subsequent expression is not subsumable unless the expression is functionally determined by the grouping items. So, in the example above, the first query block is subsumable, but requires compensation because the grouping is different. However, it is obvious that the top query block is not subsumable.

If the following data is given for columns X, Y, Z, S:

| X | Y | Z | S |
|---|---|---|---|
| 1 | 1 | 1 | 1 |
| 1 | 1 | 1 | 2 |
| 1 | 1 | 2 | 3 |

The result of Q6 is:

| C1 | S | COUNT |
|----|---|-------|
| 1  | 6 | 1     |

The MULTI_BLOCKS summary table contains:

| C1 | C2 | S | COUNT |
|----|----|---|-------|
| 1  | 1  | 3 | 2     |

It is apparent that the result of Q6 cannot be derived from the content of the summary table.

The following example illustrates the technique of performing subsumption tests and query rerouting for multiple query blocks. In particular, both the query and the summary table definition have a GROUP BY construct stacked on top of another GROUP BY construct.

Figure 10A:
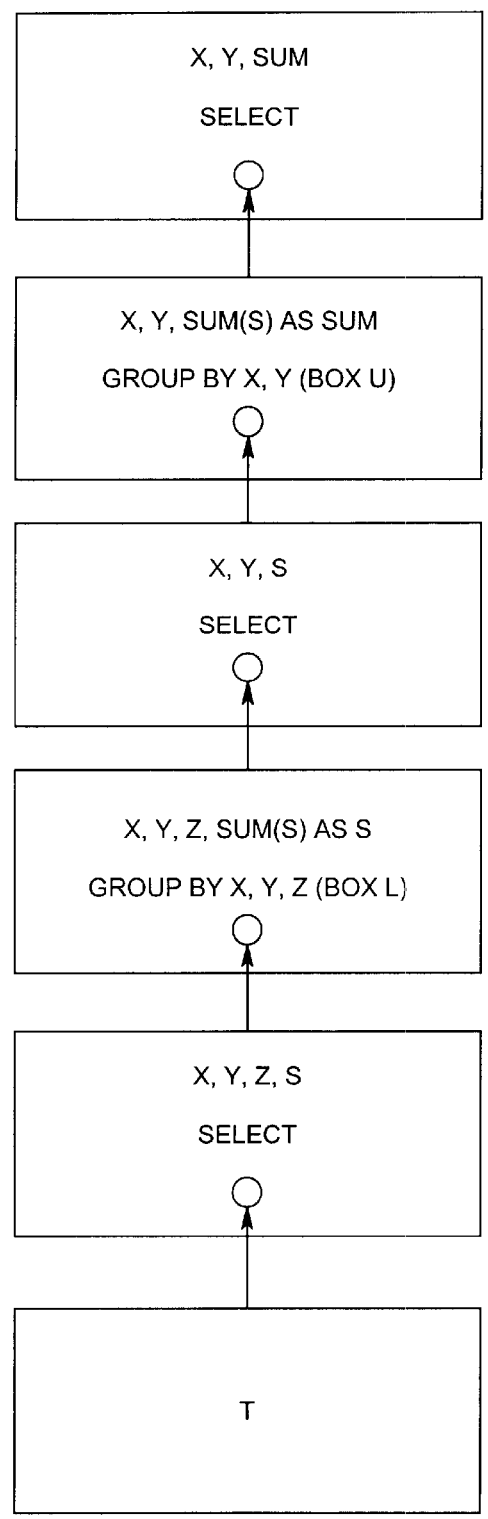
FIGS. 10A, 10B, and 10C are block diagrams of Query Graph Model representations that illustrate various SQL statements.
Figure 10B:
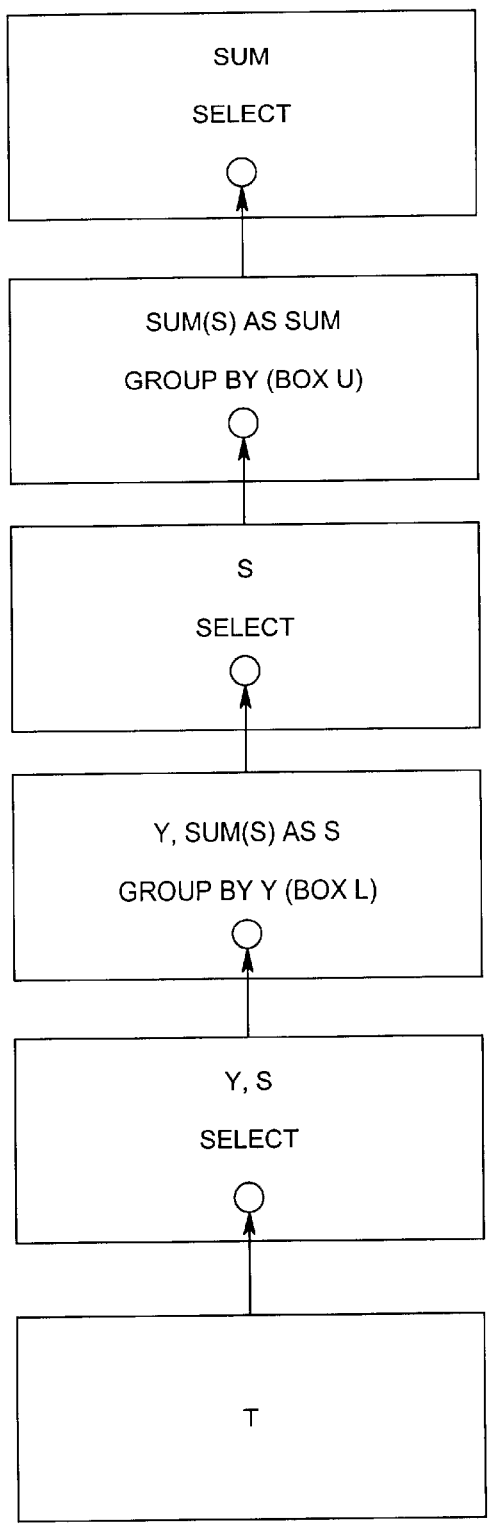
Figure 10C:
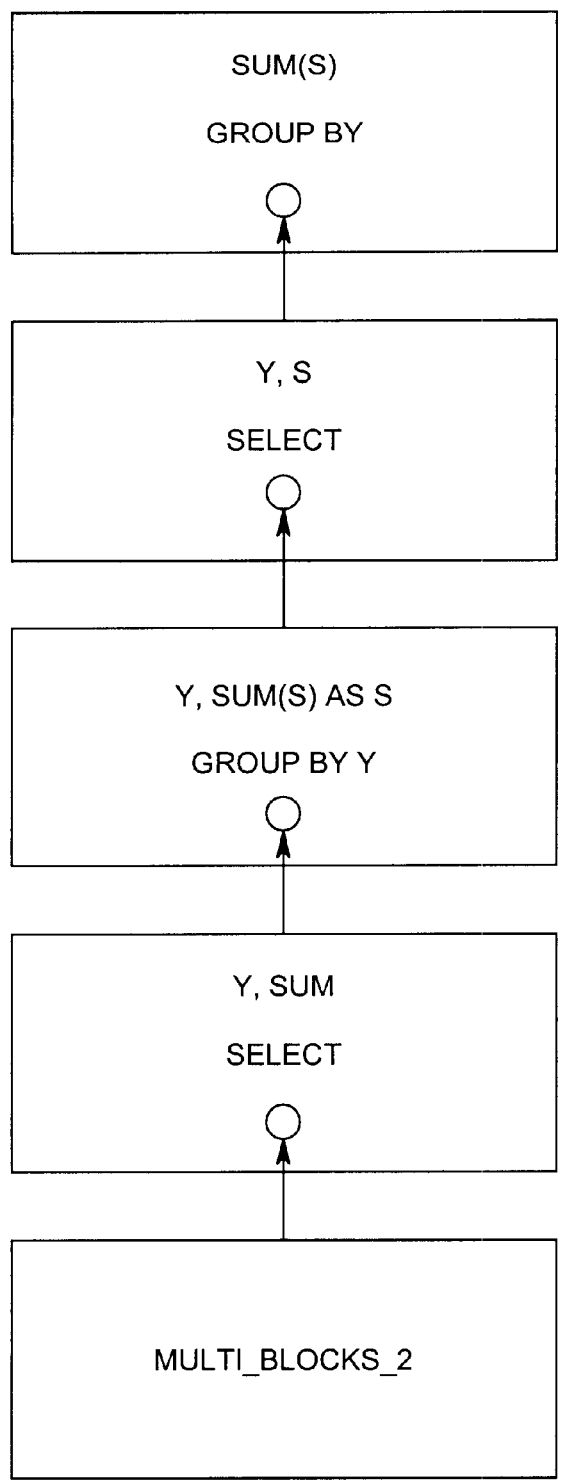

CREATE TABLE MULTI_BLOCKS_2 AS
  (SELECT X, Y, SUM(S) AS SUM
  FROM TABLE (SELECT X, Y, Z, SUM(S) AS S
    FROM T
    GROUP BY X, Y, Z) AS Q(X,Y,Z,S)
  GROUP BY X, Y);

and the query Q6:

Q6: SELECT SUM(S) AS SUM
  FROM TABLE (SELECT Y, SUM(S) AS S
    FROM T
    GROUP BY Y) AS Q(X,Y,S);

The Query Graph Model representations for the summary table definition and query Q6 are shown in FIG. 10A and FIG. 10B respectively. FIG. 10C shows the Query Graph Model representation for a rerouted query.

FIGS. 10A and 10B illustrates the techniques of the preferred embodiment of the present invention. Query subsumption tests are performed between a QGM box from the query (FIG. 10A) and a QGM box from the summary table definition (FIG. 10B).

For example, compare the boxes L in FIGS. 10A and 10B. The QGM box from the query (FIG. 10A) is clearly subsumed by the QGM box from the summary table definition (FIG. 10B), because the query groups on a subset of grouping columns of the summary table definition and all of its output columns appear in the corresponding box (L) in the summary table definition. However, compensation is required if the query is rerouted to the summary table, i.e., a GROUP BY is performed on the summary table using column Y (as shown in FIG. 10C).

As soon as such compensation is required for query subsumption tests, any subsequent subsumption test on QGM boxes above this compensated box requires additional information on how the columns were derived. This additional information can be carried from bottom to the top during the subsumption tests on QGM box-by-box approach, or equivalently gathered from boxes below dynamically.

Consider the subsumption tests on the QGM boxes U in FIGS. 10A and 10B. The GROUP BY box (U) in FIG. 10B has no GROUP BY items, whereas the GROUP BY box (U)

in FIG. 10A has two GROUP BY items. Furthermore, the grouping columns of box U in FIG. 10A are derived from the grouping columns of the lower group by box (L). Therefore, as far as grouping columns are concerned, box U in FIG. 10B is subsumed by that in FIG. 10A.

Consider the aggregate function (SUM) in box U. Syntactically, SUM(s) in both boxes U are identical. However, as mentioned above, syntactic matching is not good enough with respect to aggregation. In this case, the system needs to make sure that SUM( ) can be computed for GROUPBY of column Y using the results of the summary table. Since the upper GROUP BY columns in the summary table are still a superset of the lower GROUP BY columns in the query and the aggregation performed is algebraic, the summary table serves as an intermediate computation for the query. Since no predicates are applied above the lower GROUP BY box in the summary table, the fact that the query and the summary table both contain two GROUP BYs is irrelevant. What is important is that the result of the summary table contains intermediate results that can be used as a starting point to compute the lower GROUP BY of the query. For this reason, the rerouted query contains two compensated GROUP BY operations as shown in FIG. 10C.

It should be emphasized that the techniques presented in the preferred embodiment of the present invention are not restrict to exploitation of summary tables. The following query highlights this approach:

Q7: SELECT ACCTID, LOCID, COUNT(*) AS COUNT
   FROM TRANS
   GROUP BY ACCTID, LOCID
     HAVING LOCID IN (SELECT ID
       FROM LOC
       WHERE COUNTRY='USA')
   UNION ALL
   SELECT ACCTID, 0, COUNT(*) AS COUNT
   FROM TRANS
   GROUP BY ACCTID
     HAVING LOCID IN (SELECT ID
       FROM LOC
       WHERE COUNTRY='USA');

The first operand of the UNION operation is the same as the summary table definition of TXCOUNT4, whereas the second operand is similar to query Q4 above. Using the query rerouting technique of the preferred embodiment of the present invention, the query can be rewritten as follows:

NEW Q7: WITH DT (ACCTID, LOCID, COUNT) AS
   (SELECT ACCTID, LOCID, COUNT(*) AS COUNT
   FROM TRANS
   GROUP BY ACCTID, LOCID
     HAVING LOCID IN (SELECT ID
       FROM LOC
       WHERE COUNTRY='USA'))
   SELECT * FROM DT
   UNION ALL
   SELECT LOCID, 0, SUM(COUNT)
   FROM DT
   GROUP BY LOCID;

The optimization techniques can be applied to any set operations such as UNION, UNION ALL, INTERSECT, INTERSECT ALL, EXCEPT and EXCEPT ALL. Furthermore, the optimization techniques can be applied to any query blocks of an arbitrarily complex query.

Logic of Creating the Summary Table

Figure 11:
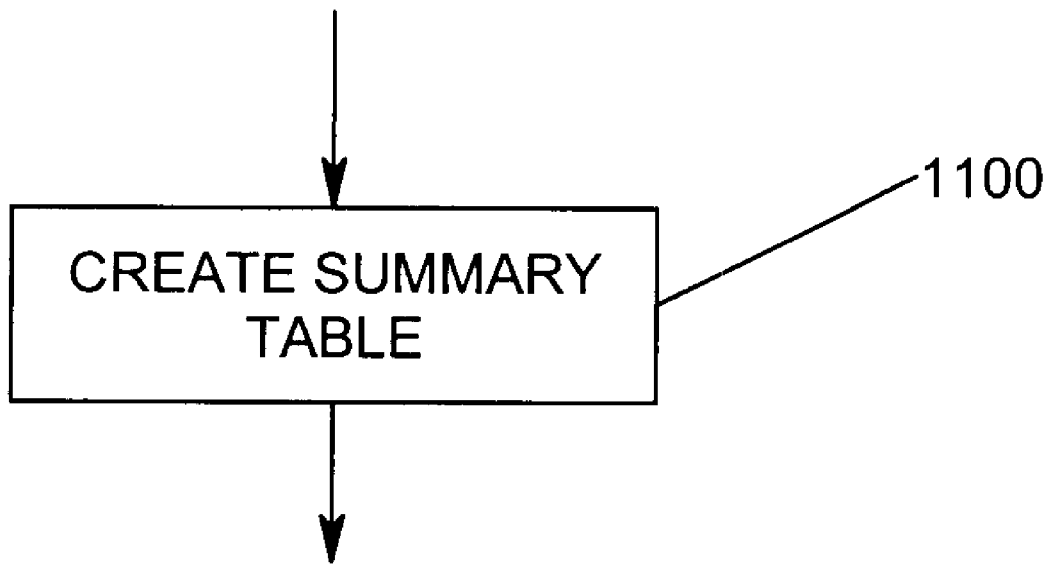
FIG. 11 is a flowchart illustrating the method of creating the summary table according to the preferred embodiment of the present invention.

FIG. 11 is a flowchart illustrating the method of creating the summary table according to the preferred embodiment of the present invention.

Block 1100 represents the computer system 100 creating a summary table that contains the result of executing a query, wherein a definition of the summary table is based on a full select statement.

Logic of the Optimization Technique

Figure 12:
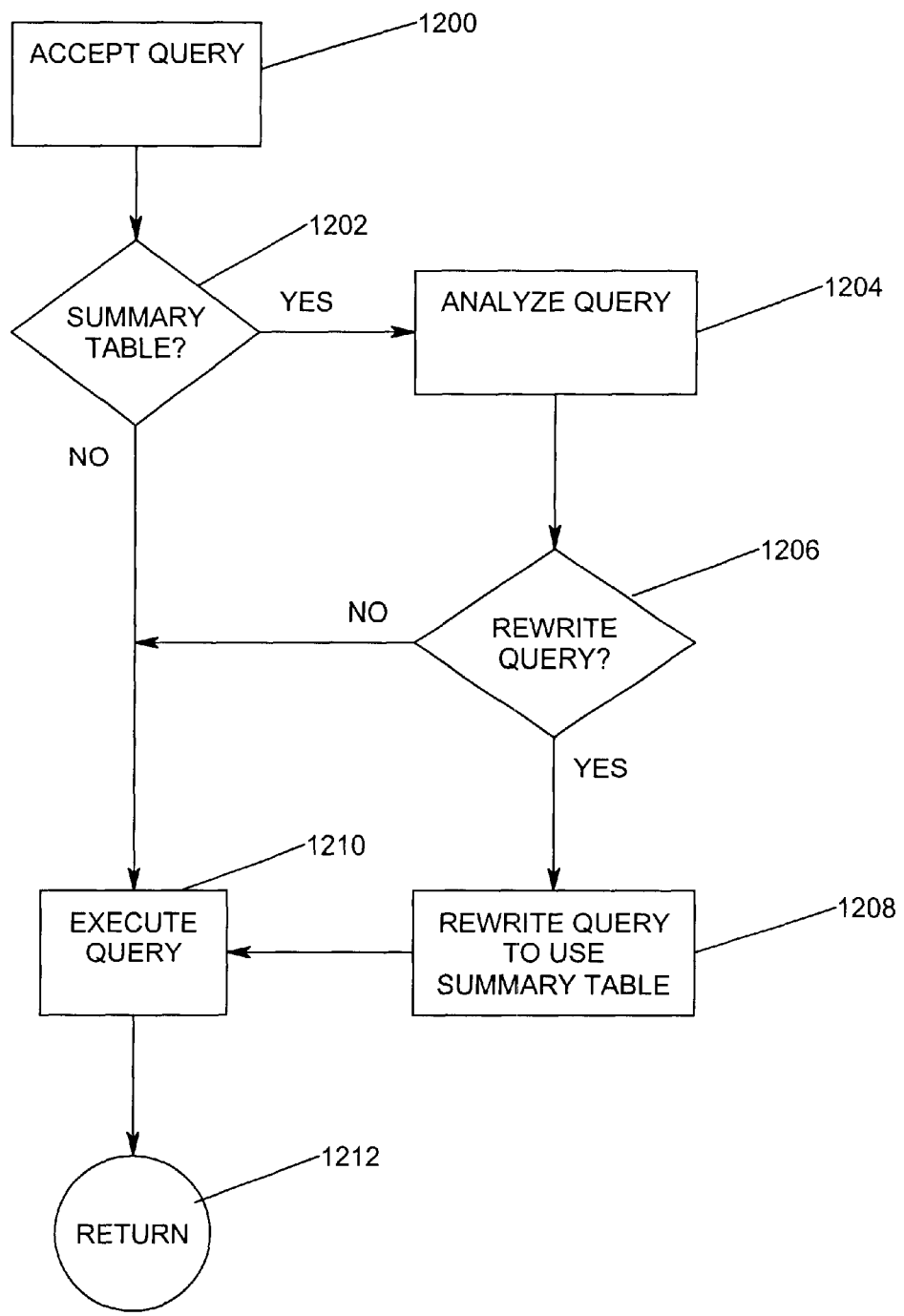
FIG. 12 is a flowchart illustrating the method of optimizing SQL queries according to the preferred embodiment of the present invention.

FIG. 12 is a flowchart illustrating the method of optimizing SQL queries in step 204 of FIG. 2 and step 314 of FIG. 3 according to the preferred embodiment of the present invention.

Block 1200 represents the computer system 100, specifically an optimizer function of the RDBMS software 106, accepting a query.

Block 1202 is a decision block that represents the computer system 100 determining whether there is one or more summary tables referencing one or more tables in the query. If so, control transfers to Block 1104; otherwise, control transfers to Block 1210.

Block 1204 represents the computer system 100 analyzing whether a summary table can be used to answer the query. Specifically, this Block performs subsumption tests between the query and the definition of the summary table to determine whether expressions occurring anywhere in the query, but not in the query block logic is as follows:

If the query block is a SELECT, wherein QBS is the query block in the summary table definition and QBQ is the query block in the query:

1. The QBS must not apply predicates that are not contained in QBQ. Otherwise, the summary table results would not be complete, i.e., it would not contain records that satisfy the results of the query.

2. The QBQ must not reference columns that are not derivable from the results of QBS.

If the query block is a GROUP BY, wherein QBS is the query block in the summary table definition and QBQ is the query block in the query:

1. The grouping items in QBQ must be a subset, not necessarily proper subset, of the grouping items in QBS.

2. The QBQ must not reference columns that are not derivable from the results of QBS. Hence, any aggregate functions in the QBQ must be computable using some set of columns in the result of QBS as intermediate results.

In order to apply the query block by query block approach to multiple query blocks, the RDBMS software must: (1) determine column mappings across multiple layers of query blocks; (2) analyze contextual information about the derivation of the column mappings; and (3) determine information about column propagation through multiple layers of query blocks. These are required as the RDBMS software is determining subsumption in a bottom up fashion and to ensure the necessary expressions are propagated through multiple layers of query blocks to the results of the summary table (e.g., Q3 mentioned above).

The approach presented in the preferred embodiment of the present invention for the multiple query blocks logic is as follows, starting at the bottom-most query blocks:

1. Determine the contextual information required for the subsumption test between a query block in the summary table definition QBS and a query block in the query QBQ. The contextual information for column mappings consists of three properties. The first property defines if the column mapping can be used for matching. In this case, the column of the QBS that maps to the column of the QBQ is a substitution for the column of the QBQ. The case where this distinction becomes important is in the results of a compensated GROUP BY. All mappings between grouping columns are substitutions. All mappings between aggregate columns are non-substitutions. Hence, any uses of the aggregate columns above the GROUP BY cannot be used to match expressions between the QBS and the QBQ. The second property of a column mapping defines if the column in the QBS can be referenced by the QBQ. When the column in the QBS can be referenced by the QBQ, we say that it is routable. Otherwise it is non-routable. The case where this distinction becomes important is again above a compensated GROUP BY. In general, expressions introduced above the compensated GROUP BY are not used by the QBQ and hence are non-routable. Rather, they are recomputed from their routable sub-expressions. They are recorded as substitutions so that they can be used for matching above the compensated GROUP BY for the purposes of matching predicates and deriving other non-routable substitutions. On the other hand, the aggregate value in the QBS is routable (which is not a substitution) as it must be used to compute the final aggregation in the QBQ. The third property is not actually carried with the mapping, but derived at the time the mapping is created. This property determines if the column in the QBS is propagated to the materialized results of the QBS. This property is required for all routable mappings.

2. Perform the subsumption test between QBS and QBQ using the contextual information; columns whose mappings do not have the substitution property cannot appear in predicates of the QBS and cannot appear as grouping columns. All expression matching (for predicates and for determining other column mappings) uses only those columns whose mappings have the substitution property. When there is a compensated GROUP BY operation, the rows produced by the GROUP BY operation in the QBS must not be duplicated.

3. Repeat steps 1 and 2 in bottom-up and in pairwise fashion between the summary table definition and the query until the topmost query block in the summary table definition is reached.

Block 1206 is a decision block that represents the computer system 100 determining whether the query should be rewritten to take advantage of one or more of the summary tables. If so, control transfers to Block 1208; otherwise, control transfers to Block 1210.

Block 1208 represents the computer system 100 rewriting the query to use the identified summary tables for answering the query. Specifically, this Block compensates complex expressions using the summary table as they are identified in Block 1204, wherein the expressions can be re-derived from one or more of the columns of the summary table.

Block 1210 represents the computer system 100 executing the query.

After these query transformation steps are performed, block 1212 returns control to block 204 in FIG. 2 or block 314 in FIG. 3 for subsequent processing steps, including the execution of the SQL query against the relational database and the output of the result set.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and article of manufacture for optimizing database queries using complex query subsumption and compensation techniques. A summary table contains the result of executing a query, wherein a definition of the summary table is based on a full select statement. A query is analyzed against the summary table definition to determine whether expressions occurring anywhere in the query, but not in the summary table definition, can be compensated using the summary table. A query is further analyzed against the summary table definition to determine if the query can be performed using the summary table when the summary table definition has a join involving a GROUP BY operation and nested GROUP BY operations. If so, the query is performed using the summary table.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer system, the query being performed by the computer system to retrieve data from a database stored on the computer system, the method comprising the steps of:

(a) accepting the query into the computer system;

(b) incorporating a query definition of one or more summary tables into the query to create a resulting query, wherein the resulting query comprises a first portion and a second portion;

(c) determining whether an input to the first portion can be re-routed to an output of the second portion, wherein the second portion comprises a relational operator between a derived table of a group by operation and one or more other tables, and the rows produced by the derived table are filtered by the relational operator;

(d) rewriting the query so that the first portion receives its input from an output of the second portion; and (e) executing the rewritten query.

2. The method of claim 1 above, wherein the relational operator between the derived table and the other tables is a join.

3. The method of claim 1 above, wherein the relational operator between the derived table and the other tables is an INTERSECT ALL.

4. The method of claim 1 above, wherein the relational operator between the derived table and the other tables is an EXCEPT ALL.

5. The method of claim 1 above, wherein the first portion is submitted by a user, and the second portion is the definition of the summary table.

6. The method of claim 1 above, wherein the first portion is a first operand of a binary set operation and the second portion is a second operand of the binary set operation.

7. The method of claim 6 above, wherein the binary set operation is a union operation.

8. The method of claim 6 above, wherein the binary set operation is an intersect operation.

9. The method of claim 6 above, wherein the binary set operation is an except operation.

10. The method of claim 1 above, wherein the step of rewriting comprises the step of performing compensation using an output of the second portion and replacing the second portion by a summary table with an identical query definition.

11. The method of claim 1 above, wherein the step of determining further comprises of the step of determining that the rows produced by the derived table are not duplicated by a join operation.

12. The method of claim 11 above, wherein the join operation between the derived table and the other tables is a N-to-1 join operation.

13. The method of claim 12 above, wherein join columns of the other tables are a superset of a unique key.

14. The method of claim 13 above, wherein the unique key is a primary key.

15. The method of claim 13 above, wherein the unique key is comprised of a unique index on a set of one or more columns.

16. The method of claim 1 above, further comprising the steps of recognizing and compensating complex expressions using an output of the second portion when the derived table is used to perform the first portion.

17. The method of claim 1 above, wherein the step of determining further comprises the step of performing subsumption tests between the first portion and the second portion.

18. The method of claim 17 above, wherein the step of performing further comprises the step of maintaining context information concerning derivation of one or more of the columns produced by the second portion in order to determine whether an expression in the first portion can be subsumed by the second portion.

19. The method of claim 17 above, wherein the step of performing further comprises the step of determining whether expressions occurring anywhere in the first portion, but not in the second portion, can be re-derived from one or more columns produced by the second portion.

20. An apparatus for optimizing a query, comprising:
  (a) a computer system having a data storage device coupled thereto for storing a database, the query being performed by the computer to retrieve data from the database; and
  (b) means, performed by the computer system, for accepting the query into the computer system; for incorporating a query definition of one or more summary tables into the query to create a resulting query, wherein the resulting query comprises a first portion and a second portion; for determining whether an input to the first portion can be re-routed to an output of the second portion, wherein the second portion comprises a relational operator between a derived table of a group by operation and one or more other tables, and the rows produced by the derived table are filtered by the relational operator; for rewriting the query so that the first portion receives its input from an output of the second portion; and for executing the rewritten query.

21. The apparatus of claim 20 above, wherein the relational operator between the derived table and the other tables is a join.

22. The apparatus of claim 20 above, wherein the relational operator between the derived table and the other tables is an INTERSECT ALL.

23. The apparatus of claim 20 above, wherein the relational operator between the derived table and the other tables is an EXCEPT ALL.

24. The apparatus of claim 20 above, wherein the first portion is submitted by a user, and the second portion is the definition of the summary table.

25. The apparatus of claim 20 above, wherein the first portion is a first operand of a binary set operation and the second portion is a second operand of the binary set operation.

26. The apparatus of claim 6 above, wherein the binary set operation is a union operation.

27. The apparatus of claim 6 above, wherein the binary set operation is an intersect operation.

28. The apparatus of claim 6 above, wherein the binary set operation is an except operation.

29. The apparatus of claim 20 above, wherein the means for rewriting comprises means for performing compensation using an output of the second portion and for replacing the second portion by a summary table with an identical query definition.

30. The apparatus of claim 20 above, wherein the means for determining further comprises means for determining that the rows produced by the derived table are not duplicated by a join operation.

31. The apparatus of claim 30 above, wherein the join operation between the derived table and the other tables is a N-to-1 join operation.

32. The apparatus of claim 31 above, wherein join columns of the other tables are a superset of a unique key.

33. The apparatus of claim 32 above, wherein the unique key is a primary key.

34. The apparatus of claim 32 above, wherein the unique key is comprised of a unique index on a set of one or more columns.

35. The apparatus of claim 20 above, further comprising means for recognizing and for compensating complex expressions using an output of the second portion when the derived table is used to perform the first portion.

36. The apparatus of claim 20 above, wherein the means for determining further comprises means for performing subsumption tests between the first portion and the second portion.

37. The apparatus of claim 36 above, wherein the means for performing further comprises means for maintaining context information concerning derivation of one or more of the columns produced by the second portion in order to determine whether an expression in the first portion can be subsumed by the second portion.

38. The apparatus of claim 36 above, wherein the means for performing further comprises means for determining whether expressions occurring anywhere in the first portion, but not in the second portion, can be re-derived from one or more columns produced by the second portion.

39. An article of manufacture embodying logic for performing method steps for optimizing a query, the query being performed by a computer system to retrieve data from a database stored in a data storage device coupled to the computer system, the method comprising the steps of:
  (a) accepting the query into the computer system;
  (b) incorporating a query definition of one or more summary tables into the query to create a resulting query, wherein the resulting query comprises a first portion and a second portion;
  (c) determining whether an input to the first portion can be re-routed to an output of the second portion, wherein the second portion comprises a relational operator between a derived table of a group by operation and one or more other tables, and the rows produced by the derived table are filtered by the relational operator;

(d) rewriting the query so that the first portion receives its input from an output of the second portion; and (e) executing the rewritten query.

40. The article of manufacture of claim 39 above, wherein the relational operator between the derived table and the other tables is a join.

41. The article of manufacture of claim 39 above, wherein the relational operator between the derived table and the other tables is an INTERSECT ALL.

42. The article of manufacture of claim 39 above, wherein the relational operator between the derived table and the other tables is an EXCEPT ALL.

43. The article of manufacture of claim 39 above, wherein the first portion is submitted by a user, and the second portion is the definition of the summary table.

44. The article of manufacture of claim 39 above, wherein the first portion is a first operand of a binary set operation and the second portion is a second operand of the binary set operation.

45. The article of manufacture of claim 44 above, wherein the binary set operation is a union operation.

46. The article of manufacture of claim 44 above, wherein the binary set operation is an intersect operation.

47. The article of manufacture of claim 44 above, wherein the binary set operation is an except operation.

48. The article of manufacture of claim 39 above, wherein the step of rewriting comprises the step of performing compensation using an output of the second portion and replacing the second portion by a summary table with an identical query definition.

49. The article of manufacture of claim 39 above, wherein the step of determining further comprises of the step of determining that the rows produced by the derived table are not duplicated by a join operation.

50. The article of manufacture of claim 49 above, wherein the join operation between the derived table and the other tables is a N-to-1 join operation.

51. The article of manufacture of claim 50 above, wherein join columns of the other tables are a superset of a unique key.

52. The article of manufacture of claim 51 above, wherein the unique key is a primary key.

53. The article of manufacture of claim 51 above, wherein the unique key is comprised of a unique index on a set of one or more columns.

54. The article of manufacture of claim 39 above, further comprising the steps of recognizing and compensating complex expressions using an output of the second portion when the derived table is used to perform the first portion.

55. The article of manufacture of claim 39 above, wherein the step of determining further comprises the step of performing subsumption tests between the first portion and the second portion.

56. The article of manufacture of claim 55 above, wherein the step of performing further comprises the step of maintaining context information concerning derivation of one or more of the columns produced by the second portion in order to determine whether an expression in the first portion can be subsumed by the second portion.

57. The article of manufacture of claim 55 above, wherein the step of performing further comprises the step of determining whether expressions occurring anywhere in the first portion, but not in the second portion, can be re-derived from one or more columns produced by the second portion.

58. A method of optimizing a query in a computer, the query being performed by the computer to retrieve data from a database stored in a data storage device coupled to the computer, the method comprising the steps of:

(a) deriving a summary table in the computer, wherein a definition of the summary table is based on a fill select statement, including a derived table involving nested GROUP BY operations and complex HAVING clauses with subqueries, that is materialized in the table and describes how the summary table was derived;

(b) analyzing the query using at least one subsumption test between the query and the definition of the summary table to determine whether the query is subsumed by the summary table definition; and (c) performing the query in the computer using the summary table when the query is subsumed by the summary table definition.

59. The method of claim 58 above, wherein the analyzing step comprises analyzing the query using the subsumption tests to determine whether expressions occurring anywhere in the query, but not in the summary table, can be derived using the content in the summary table.

60. The method of claim 58 above, wherein an expression in the query is subsumed by and compensated by the summary table when the expression can be re-derived from one or more of the columns of the summary table.

61. An apparatus for optimizing a query, comprising:

(a) a computer having a data storage device coupled thereto for storing a database, the query being performed by the computer to retrieve data from the database; and (b) one or more instructions, performed by the computer, for deriving a summary table in the computer, wherein a definition of the summary table is based on a full select statement, including a derived table involving nested GROUP BY operations and complex HAVING clauses with subqueries, that is materialized in the table and describes how the summary table was derived;

(c) one or more instructions, performed by the computer, for analyzing the query using at least one subsumption test between the query and the definition of the summary table to determine whether the query is subsumed by the summary table definition; and (d) one or more instructions, performed by the computer, for performing the query in the computer using the summary table when the query is subsumed by the summary table definition.

62. The apparatus of claim 61 above, wherein the instructions for analyzing comprise instructions for analyzing the query using the subsumption test to determine whether expressions occurring anywhere in the query, but not in the summary table, can be derived using the content in the summary table.

63. The method of claim 61 above, wherein an expression in the query is subsumed by and compensated by the summary table when the expression can be re-derived from one or more of the columns of the summary table.

64. An article of manufacture embodying logic for performing method steps for optimizing a query, the query being performed by a computer to retrieve data from a database stored in a data storage device coupled to the computer, the method comprising the steps of:

(a) deriving a summary table in the computer, wherein a definition of the summary table is based on a fill select statement, including a derived table involving nested GROUP BY operations and complex HAVING clauses with subqueries, that is materialized in the table and describes how the summary table was derived;

(b) analyzing the query using at least one subsumption test between the query and the definition of the summary table to determine whether the query is subsumed by the summary table definition; and (c) performing the query in the computer using the summary table when the query is subsumed by the summary table definition.

65. The article of manufacture of claim 64 above, wherein the analyzing step comprises analyzing the query using the subsumption test to determine whether expressions occurring anywhere in the query, but not in the summary table, can be derived using the content in the summary table.

66. The article of manufacture of claim 64 above, wherein an expression in the query is subsumed by and compensated by the summary table when the expression can be re-derived from one or more of the columns of the summary table.

* * * * *

UNITED STATES PATENT AND TRADEMARK OFFICE
CERTIFICATE OF CORRECTION

PATENT NO.    : 6,460,027 B1
DATED         : October 1, 2002
INVENTOR(S)   : Roberta Jo Cochrane et al.

It is certified that error appears in the above-identified patent and that said Letters Patent is hereby corrected as shown below:

<u>Title page,</u>
Item [56], References Cited, OTHER PUBLICATIONS, after "Blakeley", "al" should read -- al., --; after "Segev", "al Effcient" should read -- al., Efficient --; after "Levy", "al" should read -- al., --; under "Levy", after "Using Views in", "Descrioption" should read -- Description --

<u>Column 20,</u>
Line 2, "fill" should read -- full --
Line 61, "fill" should read -- full --

Signed and Sealed this

Twenty-ninth Day of July, 2003

JAMES E. ROGAN
*Director of the United States Patent and Trademark Office*